United States Patent
Jeon et al.

(10) Patent No.: US 12,255,705 B2
(45) Date of Patent: Mar. 18, 2025

(54) DEVICE AND METHOD FOR FRONTHAUL TRANSMISSION IN WIRELESS COMMUNICATION SYSTEM

(71) Applicant: SAMSUNG ELECTRONICS CO., LTD., Suwon-si (KR)

(72) Inventors: Namryul Jeon, Suwon-si (KR); Daejoong Kim, Suwon-si (KR); Jaeyoel Kim, Suwon-si (KR); Seungkyu Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/121,747

(22) Filed: Mar. 15, 2023

(65) Prior Publication Data

US 2023/0216552 A1  Jul. 6, 2023

Related U.S. Application Data

(63) Continuation of application No. PCT/KR2021/012905, filed on Sep. 17, 2021.

(30) Foreign Application Priority Data

Sep. 17, 2020 (KR) .......................... 10-2020-0120114

(51) Int. Cl.
*H04B 7/0426* (2017.01)
*H04B 7/0456* (2017.01)
*H04L 1/1607* (2023.01)

(52) U.S. Cl.
CPC ........... *H04B 7/043* (2013.01); *H04B 7/0473* (2013.01); *H04L 1/1614* (2013.01)

(58) Field of Classification Search
CPC .... H04B 7/043; H04B 7/0473; H04B 7/0617; H04B 7/0874; H04B 7/0877;
(Continued)

(56) References Cited

U.S. PATENT DOCUMENTS

| | | |
|---|---|---|
| 10,367,568 B1 | 7/2019 | Nammi et al. |
| 11,456,833 B2 | 9/2022 | Moon et al. |

(Continued)

FOREIGN PATENT DOCUMENTS

| | | |
|---|---|---|
| KR | 10-2020-0098700 A | 8/2020 |
| WO | 2020/080838 A1 | 4/2020 |
| WO | 2020/110005 A1 | 6/2020 |

OTHER PUBLICATIONS

International Search Report dated Dec. 14, 2021, issued by the International Searching Authority in International Application No. PCT/KR2021/012905 (PCT/ISA/210).
(Continued)

*Primary Examiner* — Khanh C Tran
(74) *Attorney, Agent, or Firm* — Sughrue Mion, PLLC

(57) ABSTRACT

A method performed by an open radio access network (O-RAN) distributed unit (O-DU) in a wireless communication system, the method includes: generating a control plane message comprising User Equipment (UE) scheduling information; and transmitting the control plane message to an open radio access network (O-RAN) radio unit (O-RU). The control plane message further includes section extension information. The section extension information comprises bit masking information indicating antennas to be combined.

20 Claims, 14 Drawing Sheets

(58) Field of Classification Search
CPC .. H04B 7/0613; H04B 7/0615; H04B 7/0469; H04B 7/0465; H04B 7/046; H04B 7/0434; H04L 1/1614; H04L 1/1607; H04L 1/1671; H04L 1/1685; H04L 1/1678

See application file for complete search history.

(56) References Cited

U.S. PATENT DOCUMENTS

| | | | | |
|---|---|---|---|---|
| 11,477,801 | B2* | 10/2022 | Lim | H04W 72/12 |
| 2018/0042003 | A1 | 2/2018 | Chen et al. | |
| 2019/0289497 | A1 | 9/2019 | Rajagopal | |
| 2019/0319742 | A1 | 10/2019 | Wu et al. | |
| 2019/0342809 | A1 | 11/2019 | Kim | |
| 2019/0373666 | A1 | 12/2019 | Khan | |
| 2020/0092229 | A1 | 3/2020 | Levi et al. | |
| 2020/0128496 | A1 | 4/2020 | Rama Chandran | |
| 2021/0126760 | A1* | 4/2021 | Lee | H04B 7/0617 |
| 2021/0243840 | A1* | 8/2021 | Raghothaman | H04W 88/085 |
| 2021/0266076 | A1* | 8/2021 | Chen | H04B 7/0871 |
| 2023/0057921 | A1* | 2/2023 | Sundaram | H04L 5/0023 |

OTHER PUBLICATIONS

Written Opinion dated Dec. 14, 2021, issued by the International Searching Authority in International Application No. PCT/KR2021/012905 (PCT/ISA/237).

Umesh et al., "Overview of O-RAN Fronthaul Specifications," NTT DOCOMO Technical Journal, vol. 21 No. 1, pp. 46-59, Jul. 2019.

O-RAN Fronthaul Working Group, "Control, User and Synchronization Plane Specification," Technical Specification, O-RAN.WG4.CUS.0-v04.00, Jul. 2020, Total 258 pages.

O-RAN Fronthaul Working Group, "O-RAN Fronthaul Working Group; Control, User and Synchronization Plane Specification", O-RAN.WG4.CUS.0-v04.00 Technical Specification, Jul. 1, 2020, 258 total pages, XP009534606.

O-RAN Alliance Working Group 4, "O-RAN Alliance Working Group 4; Management Plane Specification", O-RAN.WG4.MP.0-v04.00 Technical Specification, Jul. 1, 2020, 183 total pages, XP009534605.

Communication dated Feb. 15, 2024, issued by European Patent Office in European Patent Application No. 21869813.2.

* cited by examiner

| ef | extType = 0x0d | 1 | Octet N |
|---|---|---|---|
| | extLen [7:0] | 1 | N+1 |
| | antMask (1st Rx eAxC) [63:0] | 8 | N+2 |
| | antMask (2nd Rx eAxC) [63:0] | 8 | N+10 |
| | ... | ... | ... |
| | antMask (16th Rx eAxC) [63:0] | 8 | N+122 |
| | filler to ensure 4-byte boundary | var | N+130 |

| | L1 | | | | | | L2 | |
|---|---|---|---|---|---|---|---|---|
| | P1 | P2 | P3 | P4 | P5 | P6 | P7 | P8 |
| R1 | R1 x H1_1 | 0 | 0 | 0 | R1 x H2_1 | 0 | 0 | 0 |
| R2 | R2 x H1_2 | 0 | 0 | 0 | R2 x H2_2 | 0 | 0 | 0 |
| R3 | R3 x H1_3 | 0 | 0 | 0 | R3 x H2_3 | 0 | 0 | 0 |
| R4 | R4 x H1_4 | 0 | 0 | 0 | R4 x H2_4 | 0 | 0 | 0 |
| R5 | R5 x H1_5 | 0 | 0 | 0 | R5 x H2_5 | 0 | 0 | 0 |
| R6 | R6 x H1_6 | 0 | 0 | 0 | R6 x H2_6 | 0 | 0 | 0 |
| R7 | R7 x H1_7 | 0 | 0 | 0 | R7 x H2_7 | 0 | 0 | 0 |
| R8 | R8 x H1_8 | 0 | 0 | 0 | R8 x H2_8 | 0 | 0 | 0 |
| R9 | 0 | R9 x H1_9 | 0 | 0 | 0 | R9 x H2_9 | 0 | 0 |
| R10 | 0 | R10 x H1_10 | 0 | 0 | 0 | R10 x H2_10 | 0 | 0 |
| R11 | 0 | R11 x H1_11 | 0 | 0 | 0 | R11 x H2_11 | 0 | 0 |
| R12 | 0 | R12 x H1_12 | 0 | 0 | 0 | R12 x H2_12 | 0 | 0 |
| R13 | 0 | R13 x H1_13 | 0 | 0 | 0 | R13 x H2_13 | 0 | 0 |
| R14 | 0 | R14 x H1_14 | 0 | 0 | 0 | R14 x H2_14 | 0 | 0 |
| R15 | 0 | R15 x H1_15 | 0 | 0 | 0 | R15 x H2_15 | 0 | 0 |
| R16 | 0 | R16 x H1_16 | 0 | 0 | 0 | R16 x H2_16 | 0 | 0 |
| R17 | 0 | 0 | R17 x H1_17 | 0 | 0 | 0 | R17 x H2_17 | 0 |
| R18 | 0 | 0 | R18 x H1_18 | 0 | 0 | 0 | R18 x H2_18 | 0 |
| R19 | 0 | 0 | R19 x H1_19 | 0 | 0 | 0 | R19 x H2_19 | 0 |
| R20 | 0 | 0 | R20 x H1_20 | 0 | 0 | 0 | R20 x H2_20 | 0 |
| R21 | 0 | 0 | R21 x H1_21 | 0 | 0 | 0 | R21 x H2_21 | 0 |
| R22 | 0 | 0 | R22 x H1_22 | 0 | 0 | 0 | R22 x H2_22 | 0 |
| R23 | 0 | 0 | R23 x H1_23 | 0 | 0 | 0 | R23 x H2_23 | 0 |
| R24 | 0 | 0 | R24 x H1_24 | 0 | 0 | 0 | R24 x H2_24 | 0 |
| R25 | 0 | 0 | 0 | R25 x H1_25 | 0 | 0 | 0 | R25 x H2_25 |
| R26 | 0 | 0 | 0 | R26 x H1_26 | 0 | 0 | 0 | R26 x H2_26 |
| R27 | 0 | 0 | 0 | R27 x H1_27 | 0 | 0 | 0 | R27 x H2_27 |
| R28 | 0 | 0 | 0 | R28 x H1_28 | 0 | 0 | 0 | R28 x H2_28 |
| R29 | 0 | 0 | 0 | R29 x H1_29 | 0 | 0 | 0 | R29 x H2_29 |
| R30 | 0 | 0 | 0 | R30 x H1_30 | 0 | 0 | 0 | R30 x H2_30 |
| R31 | 0 | 0 | 0 | R31 x H1_31 | 0 | 0 | 0 | R31 x H2_31 |
| R32 | 0 | 0 | 0 | R32 x H1_32 | 0 | 0 | 0 | R32 x H2_32 |

DEVICE AND METHOD FOR FRONTHAUL TRANSMISSION IN WIRELESS COMMUNICATION SYSTEM

CROSS-REFERENCE TO RELATED APPLICATIONS

This application is a by-pass continuation application of International Application No. PCT/KR2021/012905, filed on Sep. 17, 2021, which is based on and claims priority to Korean Patent Application No. 10-2020-0120114, filed on Sep. 17, 2020, in the Korean Intellectual Property Office, the disclosures of which are incorporated by reference herein their entireties.

BACKGROUND

1. Field

The disclosure relates, in general, to a wireless communication system, and, in particular, to an apparatus and method for fronthaul transmission in a wireless communication system.

2. Description of Related Art

To meet a demand on wireless data traffic which has been in an increasing trend after a 4$^{th}$ Generation (4G) communication system was commercialized, there is an ongoing effort to develop an improved 5$^{th}$ Generation (5G) communication system or a pre-5G communication system. For this reason, the 5G communication system or the pre-5G communication system is called a beyond 4G network communication system or a post Long Term Evolution (LTE) communication system.

To achieve a high data transfer rate, the 5G communication system is considered to be implemented in a millimeter-wave (mmWave) band (e.g., such as a 60 GHz band). To reduce a propagation path loss at the mmWave band and to increase a propagation delivery distance, various techniques such as beamforming, massive Multiple Input Multiple Output (MIMO), Full Dimensional MIMO (FD-MIMO), array antenna, analog beam-forming, and large scale antenna have been developed in the 5G communication system.

In addition, other techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like have been developed in the 5G communication system.

In addition, Advanced Coding Modulation (ACM) technique such as Hybrid Frequency shift keying and Quadrature Amplitude Modulation (FQAM) and Sliding Window Superposition Coding (SWSC) and advanced access technologies such as Filter Bank Multi Carrier (FBMC), Non Orthogonal Multiple Access (NOMA), and Sparse Code Multiple Access (SCMA), or the like have been developed in the 5G communication system.

With increased transmission capacities in the wireless communication system, a function split for functionally splitting is applied to a base station. According to the function split, the base station may be split into a Digital Unit (DU) and a Radio Unit (RU). A fronthaul for communication between the DU and the RU needs to be defined or configured, and the fronthaul is used to transmit data for the communication.

SUMMARY

Provided are an apparatus and method for configuring a fronthaul path on a fronthaul interface.

In addition, provided are an apparatus and method for reducing a load caused by a fronthaul transmission capacity between a Digital Unit (DU) and a Radio Unit (RU) in a wireless communication system.

According to an aspect of the disclosure, a method performed by an open radio access network (O-RAN) distributed unit (O-DU) in a wireless communication system, includes: generating a control plane message includes User Equipment (UE) scheO-DUling information; and transmitting the control plane message to an O-RAN Radio Unit (O-RU). The control plane message further includes section extension information for antenna mapping. The section extension information includes bit masking information indicating whether antennas are to be combined.

The section extension information may be for antenna mapping in Uplink (UL) beamforming-based UE channel information.

The bit masking information may include a bitmap indicating whether antennas corresponding to respective bits are to be combined, and a maximum number of antennas corresponding to the bitmap is 64.

The control plane message may further include different section extension information for multi-port grouping, and the bit masking information may include bitmaps for a plurality of reception extended antenna carriers (eAxCs) related to the different section extension information.

The plurality of reception eAxCs may include a first reception eAxC and a second reception eAxC. Each bit of a bitmap corresponding to the first reception eAxC out of the bitmaps indicates whether a corresponding antenna is to be combined in the first reception eAxC, and each bit of a bitmap corresponding to the second reception eAxC out of the bitmaps indicates whether a corresponding antenna is to be combined in the second reception eAxC.

The method may further includes receiving the UE channel information from the O-RU, through a fronthaul path between the O-DU and the O-RU. The UE channel information may include information in which channel information for at least two antennas is combined out of the antennas, according to the control plane message.

According to another aspect of the disclosure, a method performed by an O-RAN Radio Unit (O-RU) of a base station in a wireless communication system, the method includes: receiving a control plane message includes User Equipment (UE) scheO-DUling information from an O-RAN distributed unit (O-DU). The control plane message further includes section extension information for antenna mapping, and the section extension information includes bit masking information indicating whether antennas are to be combined.

The section extension information may be used by the O-RU for antenna mapping in Uplink (UL) beamforming-based UE channel information.

The bit masking information may include a bitmap indicating whether antennas corresponding to respective bits are to be combined, and a maximum number of antennas corresponding to the bitmap is 64.

The control plane message may further include different section extension information for multi-port grouping, and the bit masking information may include bitmaps for a plurality of reception extended antenna carriers (eAxCs) related to the different section extension information.

The plurality of reception eAxCs may include a first reception eAxC and a second reception eAxC. Each bit of a bitmap corresponding to the first reception eAxC out of the bitmaps indicates whether a corresponding antenna is to be combined in the first reception eAxC, and each bit of a bitmap corresponding to the second reception eAxC out of the bitmaps indicates whether a corresponding antenna is to be combined in the second reception eAxC.

The method may further includes receiving the UE channel information from the O-RU, through a fronthaul path between the O-DU and the O-RU. The UE channel information may include information in which channel information for at least two antennas is combined out of the antennas, according to the control plane message.

According to another aspect of the disclosure, an O-RAN distributed unit (O-DU) of a base station in a wireless communication system, the O-DU includes: at least one transceiver; and at least one processor that is configured to: generate a control plane message includes UE scheO-DUling information; and transmit the control plane message to an O-RAN Radio Unit (O-RU). The control plane message further includes section extension information for antenna mapping, and the section extension information includes bit masking information indicating whether antennas are to be combined.

The section extension information may be for antenna mapping in Uplink (UL) beamforming-based UE channel information.

The bit masking information may include a bitmap indicating whether antennas corresponding to respective bits are to be combined, and a maximum number of antennas corresponding to the bitmap is 64.

The control plane message may further include different section extension information for multi-port grouping, and the bit masking information may include bitmaps for a plurality of reception extended antenna carriers (eAxCs) related to the different section extension information.

The plurality of reception eAxCs may include a first reception eAxC and a second reception eAxC. Each bit of a bitmap corresponding to the first reception eAxC out of the bitmaps indicates whether a corresponding antenna is to be combined in the first reception eAxC, and each bit of a bitmap corresponding to the second reception eAxC out of the bitmaps indicates whether a corresponding antenna is to be combined in the second reception eAxC.

According to another aspect of the disclosure, an O-RAN Radio Unit (O-RU) of a base station in a wireless communication system, includes: at least one transceiver; and at least one processor operatively connected to the at least one transceiver and configured to receive a control plane message includes User Equipment (UE) scheO-DUling information from an O-RAN distributed unit (O-DU). The control plane message further includes section extension information for antenna mapping, and the section extension information includes bit masking information indicating whether antennas are to be combined.

The section extension information may be used by the O-RU for antenna mapping in Uplink (UL) beamforming-based UE channel information.

The bit masking information may include a bitmap indicating whether antennas corresponding to respective bits are to be combined, and a maximum number of antennas corresponding to the bitmap is 64.

According to one or more embodiments of the disclosure, an apparatus and a method configure fronthaul paths on a fronthaul interface in case of multi-layer transmission, thereby reducing a processing load of a Radio Unit (RU) while enabling more accurate channel estimation in a Digital Unit (DU).

Advantages acquired in the disclosure are not limited to the aforementioned advantages, and other advantages not mentioned herein may be clearly understood by those skilled in the art to which the disclosure pertains from the following descriptions.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6B illustrates another example of a control message according to an embodiment of the disclosure;

FIG. 7A to FIG. 7D illustrate an example of a fronthaul path configuration according to embodiments of the disclosure;

FIG. 8 illustrates an example of a control message based on a fronthaul path configuration according to an embodiment of the disclosure.

DETAILED DESCRIPTION

Figure 1A:
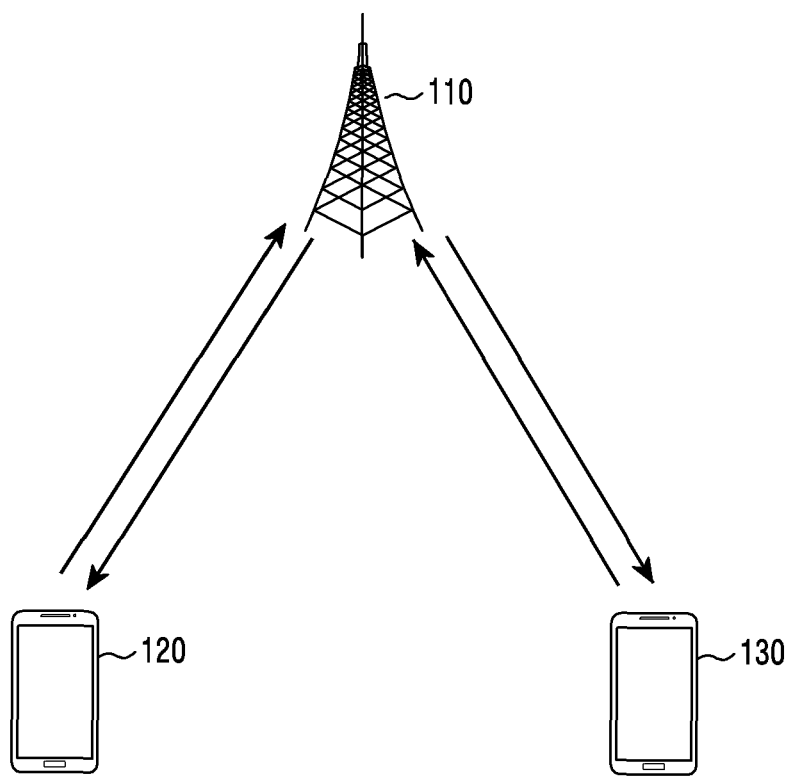
FIG. 1A illustrates a wireless communication system according to one or more embodiments of the disclosure.

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the one or more embodiments of the disclosure described hereinafter. However, since the one or more embodiments of the disclosure include a technique in which hardware and software are both used, a software-based approach is not excluded in the embodiments of the disclosure.

Hereinafter, terms used to refer to a signal (e.g., a message, information, a preamble, a signal, signaling, a sequence, a stream), terms used to refer to a resource (e.g., a symbol, a slot, a subframe, a radio frame, a subcarrier, a Resource Element (RE), a Resource Block (RB), a Bandwidth Part (BWP), an occasion), terms used to refer to an operational state (e.g., a step, an operation, a procedure), terms used to refer to data (e.g., a packet, a user stream, information, a bit, a symbol, codeword), terms used to refer to a channel, terms used to refer to control information (e.g., Downlink Control Information (DCI), Medium Access Control (MAC) Control Element (CE), Radio Resource Control (RRC) signaling), terms used to refer to network entities, terms used to refer to a constitutional element of a device, or the like are exemplified for convenience of explanation. Therefore, the disclosure is not limited to terms described below, and thus other terms having the same technical meaning may also be used.

In addition, although an expression 'greater than' or 'less than' is used in the disclosure to determine whether a specific condition is satisfied (or fulfilled), this is for exemplary purposes only and does not exclude an expression of 'greater than or equal to' or 'less than or equal to'. A condition described as 'greater than or equal to' may be replaced with 'greater than'. A condition described as 'less than or equal to' may be replaced with 'less than'. A condition described as 'greater than or equal to and less than' may be replaced with 'greater than and less than or equal to'.

In addition, the disclosure describes various embodiments by using terms used in some communication standards (e.g., 3rd Generation Partnership Project (3GPP), extensible Radio Access Network (xRAN), Open-Radio Access Network (O-RAN)). These communication standards are for exemplary purposes only. One or more embodiments of the disclosure may be easily modified and applied to other communication systems.

FIG. 1A illustrates a wireless communication system according to one or more embodiments of the disclosure. As part of nodes using a radio channel, a base station 110, a terminal 120, and a terminal 130 are exemplified in the wireless communication system of FIG. 1A. One base station is illustrated in FIG. 1A. Other base stations identical or similar to the base station 110 may be further included.

The base station 110 is a network infrastructure that provides a radio access to the terminals 120 and 130. The base station 110 has a coverage defined as a specific geographic region, based on a distance capable of transmitting a signal. In addition to the term 'base station', the base station 110 may be referred to as an 'Access Point (AP)', an 'eNodeB (eNB)', a '5$^{th}$ Generation (5G) node', a 'next generation NodeB (gNB)', a 'wireless point', a 'Transmission/Reception Point (TRP)', or other terms having equivalent technical meanings.

As a described used by a user, each of the terminal 120 and the terminal 130 communicates with the base station 110 through the radio channel. A link from the base station 110 to the terminal 120 or the terminal 130 is referred to as a Downlink (DL), and a link from the terminal 120 or the terminal 130 to the base station 110 is referred to as an Uplink (UL). In addition, the terminal 120 and the terminal 130 may communicate with each other through the radio channel. In this case, a link between the terminal 120 and the terminal 130, i.e., a Device-to-Device (D2D) link, is referred to as a sidelink, and may be used interchangeably with a PC5 interface. Optionally, at least one of the terminals 120 to 130 may be operated without user involvement. That is, as a device for performing Machine Type Communication (MTC), at least one of the terminals 120 to 130 may not be carried by the user. In addition to the term 'terminal', each of the terminals 120 and 130 may be referred to as a 'User Equipment (UE)', a 'Customer Premises Equipment (CPE)', a 'mobile station', a 'subscriber station', a 'remote terminal', a 'wireless terminal', an 'electronic device', a 'user device', or other terms having equivalent technical meanings.

The base station 110, the terminal 120, and the terminal 130 may perform beamforming. The base station and the terminal may transmit and receive a radio signal at a relatively low frequency band (e.g., a Frequency Range 1 (FR1) of NR). In addition, the base station and the terminal may transmit and receive a radio signal at a relatively high frequency band (e.g., FR2 of NR, a millimeter Wave (mmWave) band (e.g., 28 GHz, 30 GHz, 38 GHz, and 60 GHz)). In some embodiments, the base station 110 may communicate with the terminal 120 within a frequency range corresponding to the FR1. In some embodiments, the base station may communicate with the terminal 120 within a frequency range corresponding to the FR2. In this case, to improve a channel gain, the base station 110, the terminal 120, and the terminal 130 may perform beamforming.

Herein, the beamforming may include transmission beamforming and reception beamforming. That is, the base station 110, the terminal 120, and the terminal 130 may assign a directivity to a transmission signal and or a reception signal. The base station 110 and the terminals 120 and 130 may select serving beams through a beam search or beam management procedure. After the serving beams are selected, subsequent communication may be performed through a resource having a Quasi Co-Located (QCL) relation with a resource used to transmit the serving beams.

If large-scale characteristics of a channel that has delivered a symbol on a first antenna port may be inferred from a channel which has delivered a symbol on a second antenna port, it may be evaluated that the first antenna port and the second antenna port have the QCL relation. For example, the large-scale characteristics may include at least one of a delay spread, a Doppler spread, a Doppler shift, an average gain, an average delay, and a spatial receiver parameter.

In FIG. 1A, it is illustrated that both the base station 110 and the terminals 120, 130 perform the beamforming. One or more embodiments of the disclosure are not necessarily limited thereto. In some embodiments, the terminals 120, 130 may perform, or may not perform, the beamforming. In addition, the base station 110 may perform, or may not perform, the beamforming. That is, any one of the base station 110 and the terminals 120, 130 may perform the beamforming, or both the base station 110 and the terminals 120, 130 may not perform the beamforming.

In the disclosure, a beam means a spatial flow of a signal in a radio channel, and is formed by one or more antennas (or antenna elements). Such a forming process may be referred to as beamforming. The beamforming may include analog beamforming and digital beamforming (e.g., precoding). Examples of a reference signal transmitted based on the beamforming may include a Demodulation-Reference Signal (DM-RS), a Channel State Information-Reference Signal (CSI-RS), a Synchronization Signal/Physical Broadcast Channel (SS/PBCH), and a Sounding Reference Signal (SRS).

In addition, as a configuration for each reference signal, an IE such as a CSI-RS resource or an SRS-resource or the like may be used, and this configuration may include information associated with the beam. The information associated with the beam may mean whether a corresponding configuration (e.g., CSI-RS resource) uses the same spatial domain filter of another configuration (e.g., another CSI-RS resource in the same CSI-RS resource set) or uses another spatial domain filter, or to which reference signal it is subjected to Quasi-Co-Located (QCL), and if it is subjected to the QCL, which type (e.g., QCL type A, B, C, D) it is.

In a communication system having a relatively large cell radius of a base station, each base station is installed to include functions of a digital processing unit (or a Digital Unit (DU)) and a Radio Frequency (RF) processing unit (or a Radio Unit (RU)). However, since a higher frequency band is used and a cell radius of a base station is decreased in a 4th Generation (4G) and/or next-generation communication system, the number of base stations for covering a specific region is increased, and an installation cost burden of an operator is increased to install the increased number of base stations. In order to minimize the installation cost of the base station, a structure is proposed in which the DU and the RU of the base station are separated such that one or more RUs are coupled to one DU through a wired network, and one or more RUs geographically distributed to cover the specific region are disposed. Hereinafter, a structure of disposing the base station and extended examples thereof will be described according to one or more embodiments of the disclosure with reference to FIG. 1B.

Figure 1B:
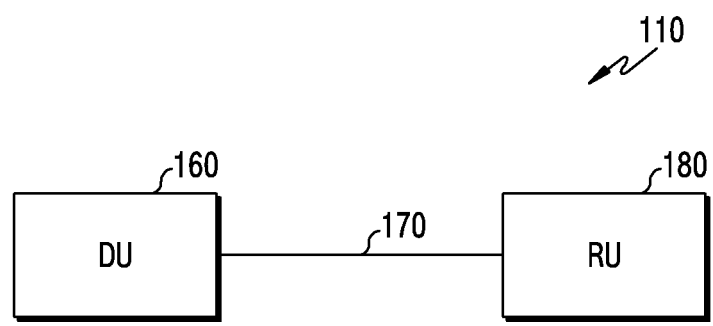
FIG. 1B illustrates an example of a fronthaul structure based on a functional split of a base station according to one or more embodiments of the disclosure.

FIG. 1B illustrates an example of a fronthaul structure based on a functional split of a base station according to one or more embodiments for the disclosure. A fronthaul refers to a connection from one entity to another, between a WLAN and the base station, unlike a backhaul between the base station and a core network.

Referring to FIG. 1B, the base station 110 may include the DU 160 and the RU 180. A fronthaul 170 between the DU 160 and the RU 180 may be operated through an $F_X$ interface. For the operation of the fronthaul 170, for example, an interface such as enhanced Common Public Radio Interface (eCPRI) or Radio Over Ethernet (ROE) may be used.

With the development of communication technology, mobile data traffic increases, which results in a significant increase in a bandwidth required in a fronthaul between a DU and an RU. In a deployment such as a Centralized/Cloud Radio Access Network (C-RAN), the DU may be realized to perform functions for Packet Data Convergence Protocol (PDCP), Radio Link Control (RLC), Media Access Control (MAC), and Physical (PHY), and the RU may be realized to further perform functions for the PHY layer in addition to a Radio Frequency (RF) function.

The DU 160 may be in charge of an upper layer function of a wireless network. For example, the DU 160 may perform a function of the MAC layer and a part of the PHY layer. Herein, the part of the PHY layer is performed at a higher level among functions of the PHY layer, and may include, for example, channel encoding (or channel decoding), scrambling (or descrambling), modulation (or demodulation), layer mapping (or layer demapping).

According to an embodiment, when the DU 160 conforms to the O-RAN standard, it may be referred to as an O-RAN DU (O-DU). Optionally, the DU 160 may be represented by being replaced with a first network entity for a base station (e.g., gNB) in embodiments of the disclosure.

The RU 180 may be in charge of a lower layer function of the wireless network. For example, the RU 180 may perform a part of the PHY layer and an RF function. Herein, the part of the PHY layer is performed at a relatively lower level than the DU 160 among the functions of the PHY layer, and may include, for example, IFFT conversion (or FFT conversion), CP insertion (CP removal), and digital beamforming. An example of such a function split is described in detail with reference to FIG. 4.

The RU 180 may be referred to as an 'Access Unit (AU)', an 'Access Point (AP)', a 'Transmission/Reception Point (TRP)', a Remote Radio Head (RRH), a 'Radio Unit (RU)', or other terms having equivalent technical meanings. Optionally, the DU 160 may be represented by being replaced with a second network entity for a base station (e.g., gNB) in embodiments of the disclosure.

Although it is described in FIG. 1B that the base station includes the DU and the RU, embodiments of the disclosure are not limited thereto. In some embodiments, the base station may be realized with a distributed deployment according to a Centralized Unit (CU) configured to perform a function of upper layers (e.g., Packet Data Convergence Protocol (PDCP), RRC) of an access network and a Distributed Unit (DIU) configured to perform a function of a lower layer. In this case, the DIU may include the Digital Unit (DU) and Radio Unit (RU) of FIG. 1B. Between a core (e.g., 5G Core (5GC) or Next Generation Core (NGC)) network and a wireless network (RAN), the base station may be realized in a structure in which a CU, a DU, and an RU are deployed in that order. An interface between the CU and the DIU may be referred to as an F1 interface.

The Centralized Unit (CU) may be coupled to one or more DIUs to be in charge of a function of an upper layer than the DIU. For example, the CU may be in charge of a function of a Radio Resource Control (RRC) and Packet Data Convergence Protocol (PDCP) layer, and the DU and the RU may be in charge of a function of a lower layer. The DU may perform some functions (high PHY) of Radio Link Control (RLC), Media Access Control (MAC), Physical (PHY) layers.

In addition, for example, the Digital Unit (DU) may be included in a DIU according to a distributed deployment realization of the base station. Hereinafter, Operations of the DU and RU are described unless otherwise defined. One or more embodiments of the disclosure may be applied to both a case where a base station including the CU is disposed and a case where the DIU is coupled directly to a core network without the CU (i.e., the CU and the DIU are implemented by being integrated as one entity).

Figure 2:
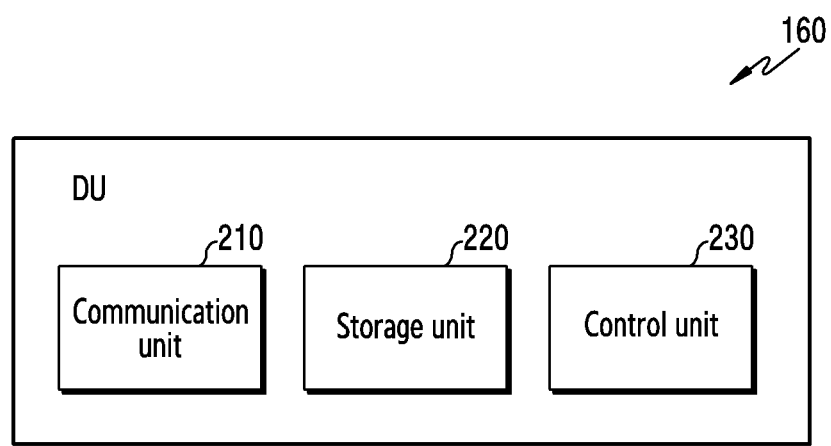
FIG. 2 illustrates a structure of a Digital Unit (DU) according to one or more embodiments of the disclosure.

FIG. 2 illustrates a structure of a Digital Unit (DU) in a wireless communication system according to one or more embodiments of the disclosure. The exemplary structure of FIG. 2 may be understood as a structure of the DU 160 of FIG. 1B. Hereinafter, the term ' . . . unit', ' . . . device', or the like implies a unit of processing at least one function or operation, and may be implemented in hardware or software or in combination of the hardware and the software.

Referring to FIG. 2, the DU 160 includes a communication unit 210, a storage unit 220, and a control unit 230.

The communication unit 210 may perform functions for transmitting/receiving a signal in a wired communication environment. The communication unit 210 may include a wired interface for controlling a direct connection between one device and another device via a transmission medium (e.g., a copper wire, an optical fiber). For example, the communication unit 210 may transfer an electrical signal to another device via the copper line, or may perform a conversion between the electrical signal and an optical signal. The communication unit 210 may be coupled to a Radio Unit (RU). The communication unit 210 may be coupled to a core network or may be coupled to a CU deployed in a distributed manner.

The communication unit 210 may perform functions for transmitting/receiving a signal in a wireless communication environment. For example, the communication unit 210 may perform a function of conversion between a baseband signal and a bit-stream according to a physical layer standard of a system. For example, in data transmission, the communication unit 210 may generate complex symbols by coding and modulating a transmitted bit-stream. In addition, in data reception, the communication unit 210 restores a received bit-stream through demodulation and decoding of a baseband signal. In addition, the communication unit 210 may include a plurality of transmission/reception paths. In addition, according to an embodiment, the communication unit 210 may be coupled to a core network or may be coupled to other nodes (e.g., Integrated Access Backhaul (IAB)).

The communication unit 210 may transmit and receive a signal. For this, the communication unit 210 may include at least one transceiver. For example, the communication unit 210 may transmit a synchronization signal, a reference signal, system information, a message, a control message, a stream, control information, data, or the like. In addition, the communication unit 210 may perform beamforming.

The communication unit 210 transmits and receives a signal as described above. Accordingly, the communication unit 210 may be referred to as a 'transmitter', a 'receiver', or a 'transceiver'. In addition, in the following description, transmission and reception performed through a radio channel are used to imply that the aforementioned process is performed by the communication unit 210.

The communication unit 210 may further include a backhaul communication unit to be coupled to the core network or a different base station. The backhaul communication unit provides an interface for performing communication with different nodes in a network. That is, the backhaul communication unit coverts a bit-stream transmitted from the base station to a different node, for example, a different access node, a different base station, a higher node, a core network, or the like, into a physical signal, and converts the physical signal received from the different node into a bit-stream.

The storage unit 220 stores data such as a basic program, application program, configuration information, or the like for an operation of the DU 160. The storage unit 220 may include a memory. The storage unit 220 may be constructed of a volatile memory, a non-volatile memory, or a combination of the volatile memory and the non-volatile memory. In addition, the storage unit 220 provides stored data according to a request of the control unit 230.

According to one or more embodiments, the storage unit 220 may include a buffer for storing an SRS. In some embodiments, the storage unit 220 may include a buffer (hereinafter, an SRS buffer) exclusively used for the SRS. In addition, in some embodiments, the storage unit 220 may include a buffer (hereinafter, a PUxCH buffer) used for a Physical Uplink Shared Channel (PUSCH) or a Physical Uplink Control Channel (PUCCH).

The control unit 230 controls overall operations of the DU 160. For example, the control unit 230 transmits and receives a signal via the communication unit 210 (or through the backhaul communication unit). Further, the control unit 230 writes data to the storage unit 220, and reads the data. In addition, the communication unit 210 may perform functions of a protocol stack required in a communication standard. For this, the control unit 230 may include at least one processor.

According to one or more embodiments, the control unit 230 may include a fronthaul path configuring unit. The control unit 230 may configure paths through which UL data is transferred between the RU and the DU in a fronthaul. As an instruction set or code stored in the storage unit 220, the fronthaul path configuring unit may be an instruction/code at least temporarily resided in the control unit 230 or a storage space storing the instruction/code, or may be part of a circuitry constituting the control unit 230. According to one or more embodiments, the control unit 230 may control the DU 160 to perform operations according to one or more embodiments described below.

The structure of the DU 160 of FIG. 2 is only an example. The example of the DU performing one or more embodiments of the disclosure is not limited to the structure illustrated in FIG. 2. The structure may be added, deleted, or changed in part according to one or more embodiments.

Figure 3:
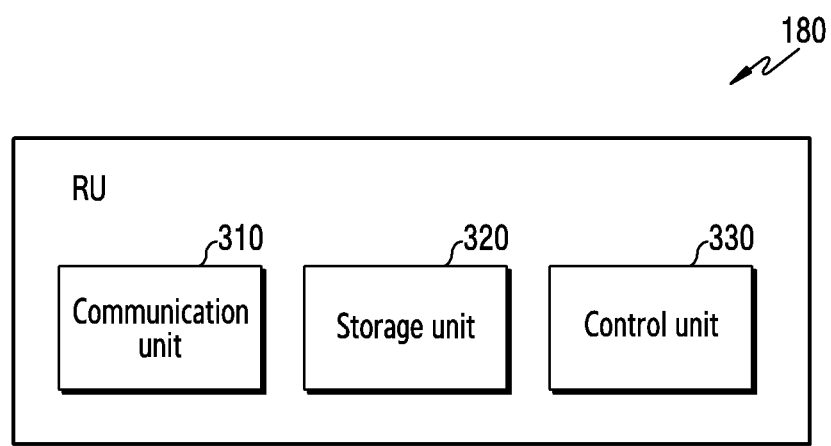
FIG. 3 illustrates a structure of a Radio Unit (RU) according to one or more embodiments of the disclosure.

FIG. 3 illustrates a structure of a Radio Unit (RU) in a wireless communication system according to one or more embodiments of the disclosure. The exemplary structure of FIG. 3 may be understood as a structure of the RU 180 of FIG. 1B. Hereinafter, the term ' . . . unit', ' . . . device', or the like implies a unit of processing at least one function or operation, and may be implemented in hardware or software or in combination of the hardware and the software.

Referring to FIG. 3, the RU 180 includes a communication unit 310, a storage unit 320, and a control unit 330.

The communication unit 310 performs functions for transmitting and receiving a signal through a radio channel. For example, the communication unit 310 up-converts a baseband signal into an RF signal and thereafter transmits it through an antenna, and down-converts an RF signal received through the antenna into a baseband signal. For example, the communication unit 310 may include a transmission filter, a reception filter, an amplifier, a mixer, an oscillator, a Digital-to-Analog Converter (DAC), an Analog-to-Digital Converter (ADC), or the like.

In addition, the communication unit 310 may include a plurality of transmission/reception paths. Further, the communication unit 310 may include an antenna unit. The communication unit 310 may include at least one antenna array constructed of a plurality of antenna elements. From a hardware aspect, the communication unit 310 may be constructed of a digital circuit and an analog circuit (e.g., a Radio Frequency Integrated Circuit (RFIC)). Herein, the digital circuit and the analog circuit may be realized as one package. In addition, the communication unit 310 may include a plurality of RF chains. The communication unit 310 may perform beamforming. In order to assign a directivity depending on a configuration of the control unit 330 to a signal to be transmitted/received, the communication unit 310 may apply a beamforming weight to the signal. According to an embodiment, the communication unit 310 may include a Radio Frequency (RF) block (or an RF unit).

In addition, the communication unit 310 may transmit and receive a signal. For this, the communication unit 310 may include at least one transceiver. The communication unit 310 may transmit a downlink signal. The downlink signal may include a Synchronization Signal (SS), a Reference Signal (RS) (e.g., Cell-specific Reference Signal (CRS), Demodulation (DM)-RS), system information (e.g., MIB, SIB, Remaining System Information (RMSI), Other System Information (OSI)), configuration message, control information, uplink data, or the like. In addition, the communication unit 310 may receive an uplink signal. The uplink signal may include a random access-related signal (e.g., Random Access Preamble (RAP) (or Message 1 (Msag1), Message 3 (Msg3)), a reference signal (e.g., Sounding Reference Signal (SRS), DM-RS), a Power Headroom Report (PHR), or the like.

The communication unit 310 transmits and receives a signal as described above. Accordingly, the communication unit 310 may be referred to as a 'transmitter', a 'receiver', or a 'transceiver'. In addition, in the following description, transmission and reception performed through a radio channel are used to imply that the aforementioned process is performed by the communication unit 310.

The storage unit 320 stores data such as a basic program, application program, configuration information, or the like for an operation of the RU 180. The storage unit 320 may be constructed of a volatile memory, a non-volatile memory, or a combination of the volatile memory and the non-volatile memory. In addition, the storage unit 320 provides stored data according to a request of the control unit 330. According to an embodiment, the storage unit 320 may include a memory for a condition, command, or setting value related to an SRS transmission method.

The control unit 330 controls overall operations of the RU 180. For example, the control unit 330 transmits and receives a signal via the communication unit 310. Further, the control unit 330 writes data to the storage unit 320, and reads the data. In addition, the communication unit 310 may perform functions of a protocol stack required in a communication standard. For this, the control unit 330 may include at least one processor. In some embodiments, the control unit 330 may include a fronthaul path configuring unit. The control unit 330 may configure paths through which UL data is transferred to the DU, based on a configuration of the DU 160. As an instruction set or code stored in the storage unit 320, the fronthaul path configuring unit may be an instruction/code resided in the control unit 330 at least temporarily or a storage space storing the instruction/code, or may be part of a circuitry constituting the control unit 330. In addition, the control unit 330 may include various modules for performing communication. According to one or more embodiments, the control unit 330 may control the RU 180 to perform operations based on one or more embodiments described below.

Figure 4:
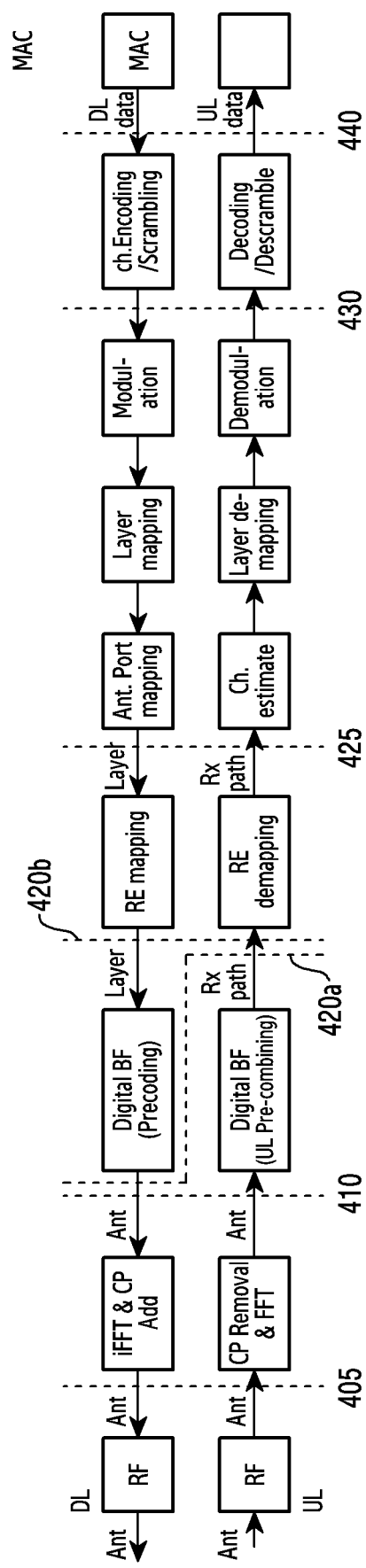
FIG. 4 illustrates an example of a function split according to one or more embodiments of the disclosure.

FIG. 4 illustrates an example of a function split in a wireless communication system according to one or more embodiments of the disclosure. With the development of wireless communication technology (e.g., with the instruction of a 5th Generation (5G) communication system (or New Radio (NR) communication system)), a frequency band to be used further increases, and a cell radius of a base station becomes very small, which results in a further increase in the number of RUs required to be installed. In addition, in the 5G communication system, an amount of data to be transmitted increases up to more than 10 times, which results in a significant increase in transmission capacity of a wired network in which fronthaul transmission is achieved. Due to these factors, installation cost of the wired network may significantly increase in the 5G communication system. Therefore, in order to decrease the transmission capacity of the wired network and to reduce the installation cost of the wired network, technologies for reducing the transmission capacity of the fronthaul by allowing the RU to be in charge of some functions of the modem of the DU have been proposed, and these technologies may be referred to a 'function split.'

In order to reduce the burden of the DU, a method in which the role of the RU responsible for only the RF function is extended to some functions of the physical layer is considered. In this case, the higher the layer of which functions are performed by the RU, the greater the throughput of the RU, which results in an increase in a transmission bandwidth in the fronthaul. At the same time, a requirement constraint for a delay time caused by response processing may be decreased.

The higher the layer of which functions are performed by the RU, the lower the virtualization gain and the higher the size/weight/cost of the RU. It may be required to realize an optimal function split by considering a trade-off of the aforementioned advantages and disadvantages.

FIG. 4 illustrates function splits in a physical layer below an MAC layer. In a Downlink (DL) case in which a signal is transmitted to a terminal through a wired network, a base station may sequentially perform channel encoding/scrambling, modulation, layer mapping, antenna mapping, RE mapping, digital beamforming (e.g., precoding), IFFT conversion/CP insertion, and RF conversion. In case of an Uplink (UL) in which a signal is received from the terminal through the wired network, the base station may sequentially perform RF conversion, FFT conversion/CP removal, digital beamforming (pre-combining), RE demapping, channel estimation, layer demapping, demodulation, and decoding/descrambling. The split for uplink functions and downlink functions may be defined in various types depending on necessity between vendors, discussion on standards, or the like according to the aforementioned trade-off A first function split 405 may be a split of the RF function and the PHY function. When the PHY function in the RU is not realized in practice, for example, the first function split may be referred to as 'Option 8.'

A second function split 410 allows the RU to perform IFFT transform/CP insertion in DL of the PHY function and FFT transform/CP removal in UL, and allows the DU to perform the remaining PHY functions. For example, the second function split 410 may be referred to as 'Option 7-1.'

A third function split 420a may allow the RU to perform IFFT conversion/CP insertion in DL and FFT conversion/CP removal in UL and beamforming, and allows the DU to perform the remaining PHY functions. For example, the third function split 420a may be referred to as 'Option 7-2× Category A (Cat. A).'

A fourth function split 420b allows the RU to perform up to digital beamforming in both DL and UL, and allows the DU to perform higher PHY functions after digital beamforming. For example, the fourth function split 420b may be referred to as 'Option 7-2× Category B (Cat. B).'

A fifth function split 425 allows the RU to perform up to RE mapping (or RE demapping) in both DL and UL, and allow the DU to perform higher PHY functions after RE mapping (or RE demapping). For example, the fifth function split 425 may be referred to as 'Option 7-2.'

A sixth function split 430 allows the RU to perform up to modulation (or demodulation) in both DL and UL, and allows the DU to perform higher PHY functions after modulation (or demodulation). For example, the sixth function split 430 may be referred to as 'Option 7-3.'

A seventh function split 440 allows the RU to perform up to encoding/scrambling (or decoding/descrambling) in both DL and UL, and allows the DU to perform higher PHY functions after modulation (or demodulation). For example, the seventh function split may be referred to as 'Option 6.'

According to an embodiment, when large-capacity signal processing is expected as in FR1 MMU, a function split at a relatively upper layer (e.g., the fourth function split 420b) may be required to reduce fronthaul capacity. In addition, a function split at an extremely high layer (e.g., the sixth function split 430) may have a complicated control interface and may cause a burden on the realization of the RU because a plurality of PHY processing blocks are included in the RU. Therefore, an appropriate function split may be required according to a method of deploying and realizing the DU and the RU.

According to an embodiment, when it is not possible to process precoding of data received from the DU (that is, when there is a limitation in precoding capability of the RU), the third function split 420a or a function split lower than that (e.g., the second function split 410) may be applied. On the contrary, when there is an ability to process the precoding of the data received from the DU, the fourth function split 420b or a function split higher than that (e.g., the sixth function split 430) may be applied.

Hereinafter, one or more embodiments of the disclosure are described based on the third function split 420a (category A) or fourth function split 420b (category B) for performing a beamforming process in one RU unless otherwise limited. It may not mean that a configuration of an embodiment through other function split is excluded. A functional configuration, signaling, or operation of FIG. 5 to FIG. 9 described below may be applied not only to the third function split 420a or the fourth function split 420b but also other function splits.

According to one or more embodiments of the disclosure, standards of eCPRI and O-RAN are described, for example, as a fronthaul interface, when a message is transmitted between a DU (e.g., the DU 160 of FIG. 1B) and an RU (e.g., the RU 180 of FIG. 1B). An eCPRI header and an O-RAN header, and an additional field may be included in an Ethernet payload of a message. One or more embodiments of the disclosure are described hereinafter by using terms of the standard of eCPRI or O-RAN. Other expressions having the same meaning as the respective terms may be used instead of one or more embodiments of the disclosure.

A transport protocol of the fronthaul may use Ethernet and eCPRI that are easily shared with a network. An eCPRI header and an O-RAN header may be included in an Ethernet payload. The eCPRI header may be located in front of the Ethernet payload. The content of the eCPRI header is as follows.

ecpriVersion (4 bits): 0001b (fixed value)
ecpriReserved (3 bits): 0000b (fixed value)
ecpriConcatenation (1 bit): 0b (fixed value)
ecpriMessage (1 byte): Message type
ecpriPayload (2 bytes): Payload size in bytes
ecpriRtcid/ecpriPcid (2 bytes): x, y, and z may be configured through a Management plane (M-plane). This field may indicate a transmission path (an extended Antenna-carrier (eAxC) in eCPRI) of a control message according to one or more embodiments in multi-layer transmission.
CU_Port_ID (x bits): Identify a channel card. Identification is possible by including even a modem (2 bits for channel card, 2 bits for Modem)
BandSector_ID (y bits): Identification based on cell/sector
CC_ID (z bits): Identification based on component carrier
RU_Port_ID (w bits): Identification based on layer, T, antenna, etc. ecpriSeqid (2 bytes): Sequence ID is managed for each ecpriRtcid/ecpriPcid, and Sequence ID and subsequence ID are managed separately. Radio-transport-level fragmentation is possible when using Subsequence ID (different from Application-level fragmentation).

An application protocol of the fronthaul may include a Control plane (C-plane), a User plane (U-plane), a Synchronization plane (S-plane), and a Management plane (M-plane).

The C-plane may be configured to provide scheduling information and beamforming information through the control message. The U-plane may include user's downlink data (IQ data or SSB/RS), uplink data (IQ data or SRS/RS), or PRACH data. A weight vector of the aforementioned beamforming information may be multiplied by the user's data. The S-plane may be related to timing and synchronization. The M-plane may be related to an initial setup, non-real-time reset or a reset, and a non-real-time report.

A section type defines a type of a message transmitted in the C-plane. The section type may indicate a usage of the control message transmitted in the C-plane. For example, a usage for each section type is as follows.

sectionType=0: DL idle/guard periods –Tx blanking usage for power saving
sectionType=1: Mapping of BF index or weight to RE of DL/UL channel (in O-RAN mandatory BF manner)
sectionType=2: Reserved
sectionType=3: Mapping of beamforming index or weight to RE of PRACH and mixed-numerology channel
sectionType=4: Reserved
sectionType=5: Transfer of UE scheduling information (in O-RAN optional BF manner) so that RU is capable of calculating BF weight on real-time basis
sectionType=6: Transfer of UE channel information (in O-RAN optional BF manner) periodically so that RU is capable of calculating BF weight on real-time basis
sectionType=7: Used to support LAA A section extension field may be defined additionally in the section type to transfer information for a specific function. Accordingly, a basic field configuration is as follows.

(1) extType (extension type): This parameter may provide an extension type which provides an additional parameter specific to subject data extension. An O-RU or O-DU which receives "reserved" section extension shall ignore extension and any parameters contained therein.

(2) ef (extension flag): This parameter is used to indicate whether there is another extension (ef=1) or whether this is last extension (ef=0).

(3) extLen (extension length): This parameter provides a section extension length in units of 32-bit (or 4-byte) words. Since a value 0 is reserved, at least one word (a word containing extType and extLen) always exists in extension.

UL beamforming in a massive MIMO system is for estimating UL layer data of each user from data streams received from a plurality of antennas. In this case, channel gain information obtained from a UE through an SRS or a UL Demodulation (DM)-Reference Signal (RS) may be used in the estimation of the UL layer data. In an O-RAN Fronthaul (FH) standard, a DU-RU split configuration is defined as a 7-2× interface (e.g., Option 7-2× Cat A or Cat B of FIG. 4) by determining the purpose of reducing a data rate of a fronthaul, simplification of an RU function, easiness of upgrading a DU, or the like.

In the existing ORAN FH v3.0 CUS-plane standard, in case of UE channel-based UL beamforming, the number of UL paths through which an RU transfers data to a DU through a fronthaul may be equal to the maximum number of UL layers to be allocated. In this case, a UL BF function between the DU and the RU may be configured in two types as follows: a first method in which the RU transmits all pieces of data, received from all antennas, to the DU through the fronthaul by performing low-PHY processing; and a second method in which the RU transmits UL layer data, obtained by applying a correct channel estimator to the all pieces of data received from the antenna, to the DU through the fronthaul.

However, the aforementioned methods cause a burden on the RU due to high fronthaul transmission capacity. Specifically, in the first method, an operator's network configuration and maintenance coat increase due to significant consumption of transmission capacity of the fronthaul. In the second method, a material cost/size/weight of the RU increases to include the correct channel estimator, resulting in a decrease in product competitiveness. In addition, high fronthaul transmission capacity acts as a burden on the DU as well as the RU.

Hereinafter, in order to solve the aforementioned problems, the disclosure proposes an apparatus and a method for reducing transmission capacity of a fronthaul between a DU and an RU when performing UL beamforming (or UL multi-layer transmission).

Figure 5:
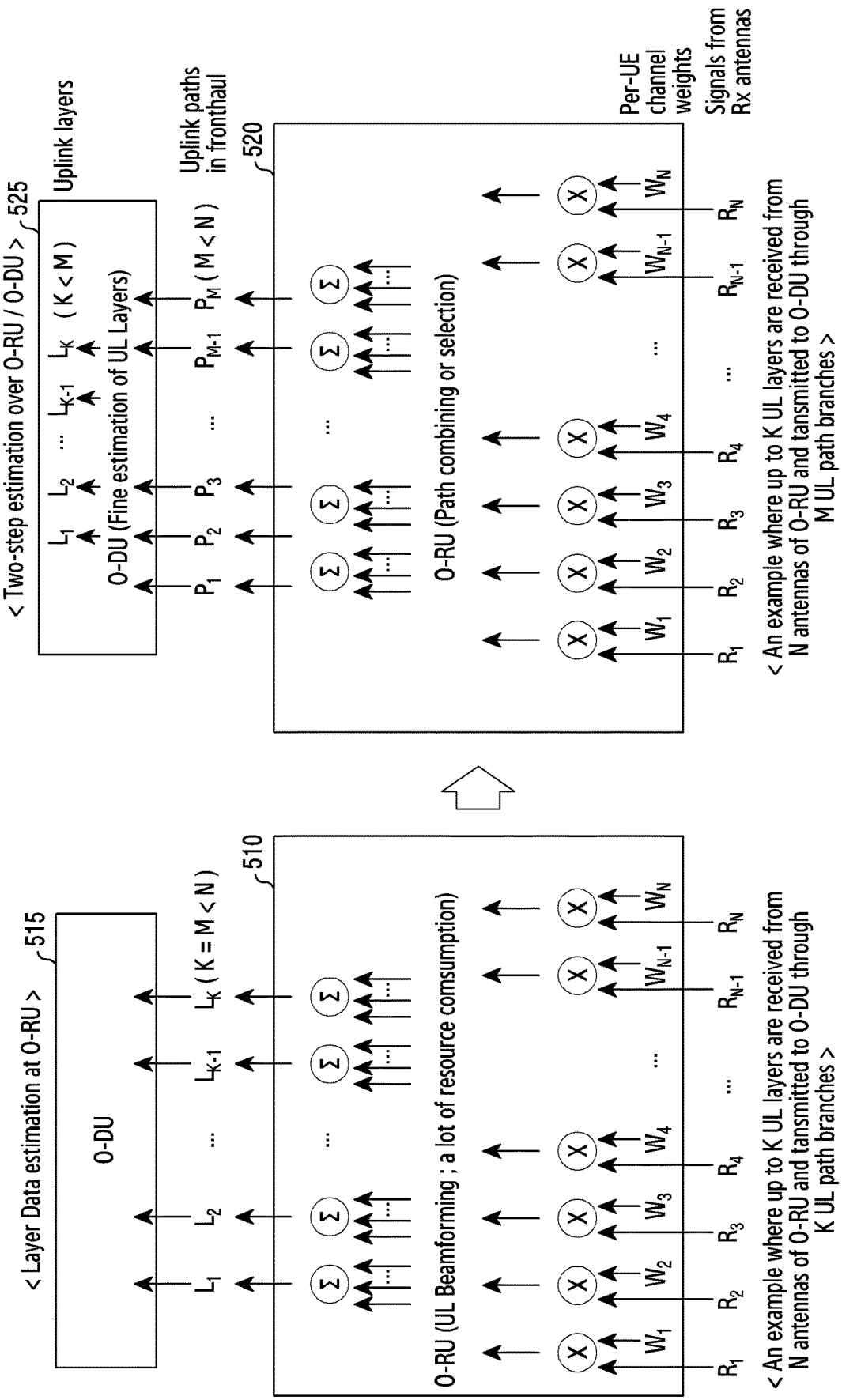
FIG. 5 illustrates an example of configuring a fronthaul path for multi-layer transmission according to an embodiment of the disclosure.

FIG. 5 illustrates an example of configuring a fronthaul path for multi-layer transmission according to an embodiment of the disclosure. A fronthaul (FH) path refers to a path of a fronthaul between a DU and an RU, through which signals received via antennas of the RU are combined or selected, and then, are transferred from the RU to the DU. The FH path may also be replaced with terms having equivalent technical meanings such as an FH port or an FH line, a receive endpoint, or the like. Hereinafter, several variables are defined first to describe a fronthaul path configuration to be proposed through embodiments of the disclosure.

The RU may have N receive (Rx) antennas. The RU may receive a signal through each Rx antenna. For example, the RU may receive signals of $R_1, R_2, R_3, \ldots, R_N$ through the Rx antennas. $R_i$ may denote a signal received through an Rx antenna corresponding to an antenna port identifier (RU_port_ID) (or a spatial stream identifier) i. Information on a channel experienced by each Rx antenna is independent. That is, there are N channels in the presence of the N Rx antennas. For example, the N channels may be denoted by $H_1, H_2, H_3, \ldots, H_N$, or may be denoted by $H_{a\_b}$ as a channel for a b-th antenna of a UE_a. A weight for each channel H may be denoted by W. That is, weights for the N channels may be denoted by $W_1, W_2, \ldots, W_N$.

Referring to FIG. 5, an RU 510 may not have a stepwise fronthaul configuration according to embodiments of the disclosure. Herein, the stepwise fronthaul configuration means that fronthaul paths are configured such that the number of fronthaul paths is greater than the number of layers and less than the number of antenna ports. Operations according to the stepwise fronthaul configuration are described below in detail through an operation of an RU 520.

The RU 510 may derive UL layers from signals to be received, and may transmit a data estimation result thereon to a DU 515 through a fronthaul. In this case, signals received through different Rx antennas experience different channels. Signals incoming by experiencing different channels need to be aggregated for channel estimation. The maximum number of UL layers is K. Weights are applied to signals received at respective Rx antennas, and results for the Rx antennas are collected to derive data information for K layers in total (e.g., $L_1, L_2, L_3, \ldots, L_K$). The data information for the K layers (e.g., $L_1, L_2, L_3, \ldots, L_K$) is transferred from the RU to the DU through the fronthaul. In this case, the number of fronthaul paths is K.

A process of deriving N signals received from the N Rx antennas and K pieces of UL layer data from N channel weights cause high complexity. This is because the complexity increases in proportion to the number of reception signals, the number of channel weights, or the number of layers. Therefore, if the process of deriving the UL layer data of each terminal is performed in the RU, a performance requirement of the RU increases, which leads to an inefficient result in terms of economy/functionality. In order for the RU to accurately estimate the UL layer data in a mMIMO system (e.g., 7-2×mMIMO system), the RU consumes a lot of resources, thereby requiring increasing a hardware size and high cost.

Even if the process of deriving the UL layer data from the received channel information is performed by the DU (not by the RU), the RU still faces high requirements about the size and the cost. This is because, for calculation in the DU, the RU is required to transmit every received channel information (e.g., information received through an antenna and channel information of each antenna) to the DU. Since this results in an increase of a bandwidth of a fronthaul between the RU and the DU, high performance of the RU is required.

As described above, a processing load in the DU and a processing load in the RU are in a trade-off relationship. In order to solve this problem, the disclosure proposes a method of estimating a channel for signals received from antennas and sharing a load for deriving UL layer data from a channel estimation result between the DU and the RU.

Operations according to a stepwise fronthaul configuration proposed in the disclosure may include two steps of operations. In other words, in case of UL MU-MIMO based on UE channel information, a process of deriving UL layer data may be configured operation-by-operation. Each operation may be referred to as a 'BF block.'

Operation (1) (coarse operation): The RU may combine (fixed or MRC) or select information received from an Rx antenna by aggregating information of an Rx path according to a fronthaul bandwidth, and thus, may transmit generated information to the DU. In the coarse operation performed by the RU, signals may be combined or some of them may be selected in Rx antennas by using a weight for each antenna from UE channel information. Hereinafter, in the disclosure, information transmitted from the fronthaul to the DU may be referred to as various terms, such as channel estimation information, FH level channel information, FH channel estimation information, combined channel estimation information, selected channel estimation information, chosen channel information, intermediate channel information, intermediate channel estimation information, or the like.

Operation (2) (fine operation): The DU may perform accurate UL layer data estimation, based on information received from the RU. For example, the DU may perform Minimum Mean Square Error (MMSE). In this case, since real time UL DM-RS information is used, accuracy of an estimation result may be increased.

For the aforementioned 2-operation UL layer data estimation process, a process of configuring a corresponding function to the RU may be referred to as a stepwise fronthaul configuration. The RU 520 may be configured with a stepwise fronthaul configuration according to embodiments of the disclosure. According to the stepwise fronthaul configuration, the RU 520 may generate intermediate channel information (or intermediate estimation information) to be transferred through fronthaul paths to a DU 525, instead of driving UL layers directly from received signals. The number of fronthaul paths may be M. Herein, M may be set to be greater than K which is the number of UL layers and less than N which is the number of antennas.

The RU 520 may generate intermediate channel information to be transferred through M fronthaul paths among M channel weights and N signals received from Rx antennas. According to an embodiment, for M fronthaul paths, the RU 520 may select some of N channel weights and N signals received from Rx antennas. The RU 520 may collect selected sets and generate intermediate channel information (also referred to as selected channel information) to be transferred through M fronthaul paths.

In addition, according to an embodiment, for M fronthaul paths, the RU 520 may combine some of N channel weights and N signals received from Rx antennas. For example, the RU 520 may generate intermediate channel information (also referred to as 'combined channel information') for M fronthaul paths through Maximum Ratio Combining (MRC). That is, the RU 520 may perform UL beamforming according to a 1-operation (coarse-operation) procedure.

The RU 520 may transfer generated intermediate channel information to the DU. Since the RU 520 transfers M pieces of intermediate channel information generated through combination or selection, not entire channel information (i.e., N×N channel information), to the DU 525, a load of fronthaul transmission capacity is relatively decreased. The RU 520 may transfer channel information for M fronthaul paths to the DU 525 through a fronthaul interface.

The DU 525 may receive channel information for the M fronthaul paths from the RU 520. The DU 525 may estimate K pieces of UL layer data, based on the channel information for the M fronthaul paths. That is, the DU 525 may perform UL beamforming according to a 2-operation (fine-operation) procedure. Embodiments of the disclosure may maintain competitiveness such as material cost/size/weight of the RU while using as little fronthaul transmission capacity as possible through a two-stage Beamforming (BF) block configuration between the DU and the RU.

In order to configure the aforementioned 2-stage beamforming, it is required to pre-define or configure an agreement on UL data processing between the DU and the RU. That is, the disclosure proposes to change a C-plane protocol for supporting the 2-operation UL processing in beamforming based on UL channel information.

According to an embodiment, the DU may transmit a control message to the RU to perform the aforementioned 2-operation UL beamforming processing. The DU may transmit a control message to the RU to configure a stepwise fronthaul path. According to the control message received from the DU, the RU may configure a fronthaul path and generate M pieces of channel estimation information for UL data estimation according to each layer. Hereinafter, examples of the control message are described with reference to FIG. 6A and FIG. 6B.

The DU may transmit configuration information (as O-RAN Control plane (C-plane) information) to the RU. In addition to section type information, the DU may transmit a control message for a stepwise fronthaul configuration to the RU.

According to an embodiment, in the control message, configuration information for the stepwise fronthaul configuration may be configured in a session extension type format. The configuration information may include indication information for specifying UL data streams that are candidate groups of combining or selecting M respective fronthaul paths (or FH ports), among N UL data streams received in N Rx antennas. In other words, the indication information may indicate whether a specific fronthaul information uses each antenna to generate intermediate channel information. For example, the indication information may be indicated in a bit-masking format.

According to an embodiment, the configuration information proposed in the disclosure may be used together with control information having a section type of 5. The section type 5 means UE scheduling information. In the section type 5, the control message may include UE scheduling information so that the RU is able to calculate a BF weight on a real-time basis.

Figure 6A:
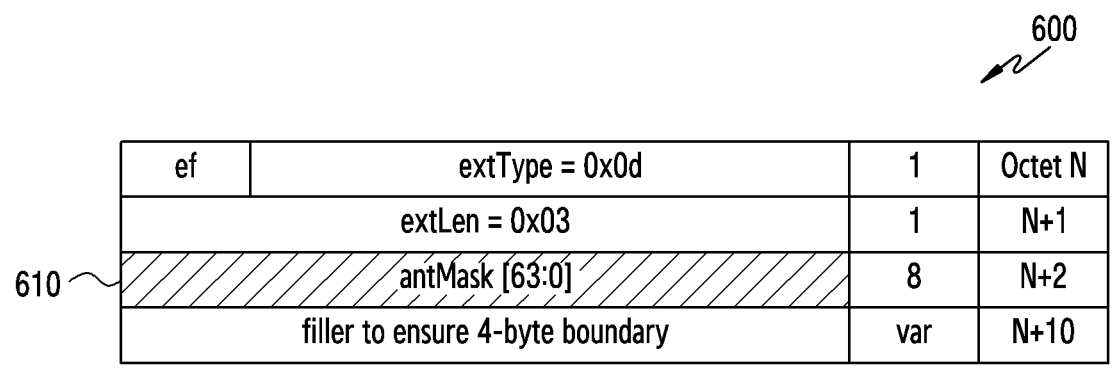
FIG. 6A illustrates an example of a control message according to an embodiment of the disclosure.

FIG. 6A illustrates an example of a control message 600 according to an embodiment of the disclosure. According to an embodiment, the control message 600 may include information of a section extension type format used independently.

Referring to FIG. 6A, the control message 600 may include indication information 610. The indication information 610 may be expressed as a bitmap, and may indicate whether to use a signal of each Rx antenna port and a channel value thereof in selection or combination. Indication information 630 is 'antMask [63:0].' Each bit indicates whether a signal of a corresponding Rx antenna port and a channel value thereof is used for selection or combination, in a channel information configuration transferred through a fronthaul. For example, a value of a $3^{rd}$ bit in 'antMask [63:0]' indicates whether a signal of a $3^{rd}$ Rx antenna (RU_port ID=2) and a corresponding channel value are used to configure channel information transferred through the fronthaul.

For example, a value of a $23^{rd}$ bit in 'antMask [63:0]' indicates whether a signal of a $23^{rd}$ Rx antenna (RU_port ID=22) and a corresponding channel value are used to configure channel information transferred through the fronthaul. For example, a bit value set to '1' indicates that a signal of a corresponding antenna and a channel value thereof are used to configure channel information transferred through the fronthaul. As another example, a bit value set to '0' indicates that a signal of a corresponding antenna and a channel value thereof are not used to configure channel information transmitted through the fronthaul.

The control message 600 may further include type information, length information, a flag, and filler information. The type information is 'extType', and may indicate an ID of a section extension type for indicating that the control message 600 includes the aforementioned indication information 610. The length information is 'extLength', and indicates a length according to section extension. For example, the length information 'extLength' may be set to 3 in the case of the control message 600. A flag may indicate whether a section extension type is present, and may be set to 0 in case of the control message 600. The filler information may be a 'filler to ensure 4-byte boundary' and may indicate an area filled to match a size of configuration information.

FIG. 6B illustrates another example of a control message according to an embodiment of the disclosure. According to an embodiment, a control message 650 may include information of a session extension type format used together with information of a section extension type #10.

Referring to FIG. 6B, the control message 650 may include indication information 660. The indication information 660 may be expressed as a bitmap, and may indicate whether to use a signal of each Rx antenna port and a channel value thereof in selection or combination. Information of the section extension type #10 may include information on a beam ID for each port. The indication information 660 may indicate whether to use a signal of each Rx antenna port and a channel value thereof in selection or combination, together with the section extension type #10. The indication information 660 may include up to 16 pieces of 'antMask [63:0] ' in total.

One piece of 'antMask [63:0]' may correspond to one fronthaul path. In other words, up to 16 fronthaul paths may be configured between DL and UL. In other words, when used together with the section extension type #10, another format may be applied based on the support of 16 UL FH ports. Capacity of 128 (=16×8) bytes may be added in extension information of the control message.

The control message 650 may further include type information, length information, a flag, and filler information. The type information is extType', and may indicate an ID of a section extension type for indicating that the control message 650 includes the aforementioned indication information 660. The length information is 'extLength', and indicates a length according to section extension. A flag may indicate whether a section extension type is present, and may be set to 0 in case of the control message 650. The filler information may be 'filler to ensure 4-byte boundary' and may indicate an area filled to match a size of configuration information.

FIG. 7A to FIG. 7D illustrate examples of a fronthaul path configuration according to embodiments of the disclosure. K denotes the number of UL layers, that is, the number of UL data streams. M denotes the number of fronthaul paths between DL and UL, in other words, the number of FH ports.

Figure 7A:
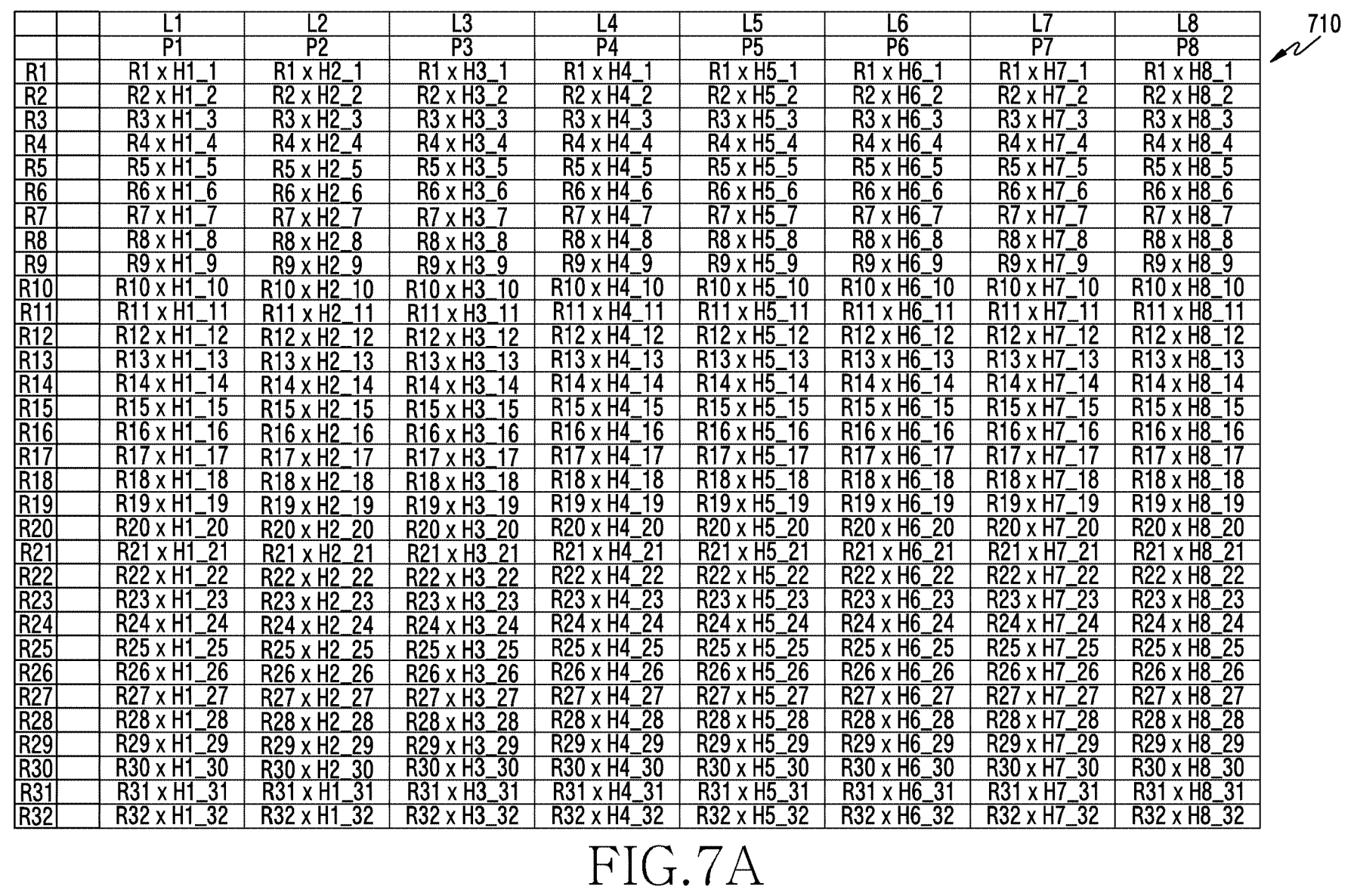

FIG. 7A illustrates an example of a fronthaul path configuration, when K=8 and M=8 in 32T32R. Referring to FIG. 7A, $R_k$ denotes a signal received at a k-th antenna. $H_{a\_b}$ means a channel for a b-th antenna of an a-th user. As identified in a fronthaul path configuration 710, UL layer data may be configured for 8 users in total. Each user corresponds to a single layer stream. An RU may collect a channel result received through 32 antenna ports for 8 users in total. Since the RU needs to deliver 256 pieces of channel data to a DU, the fronthaul path configuration 710 requires relatively high fronthaul transmission capacity compared to embodiments described below.

Figure 7B:
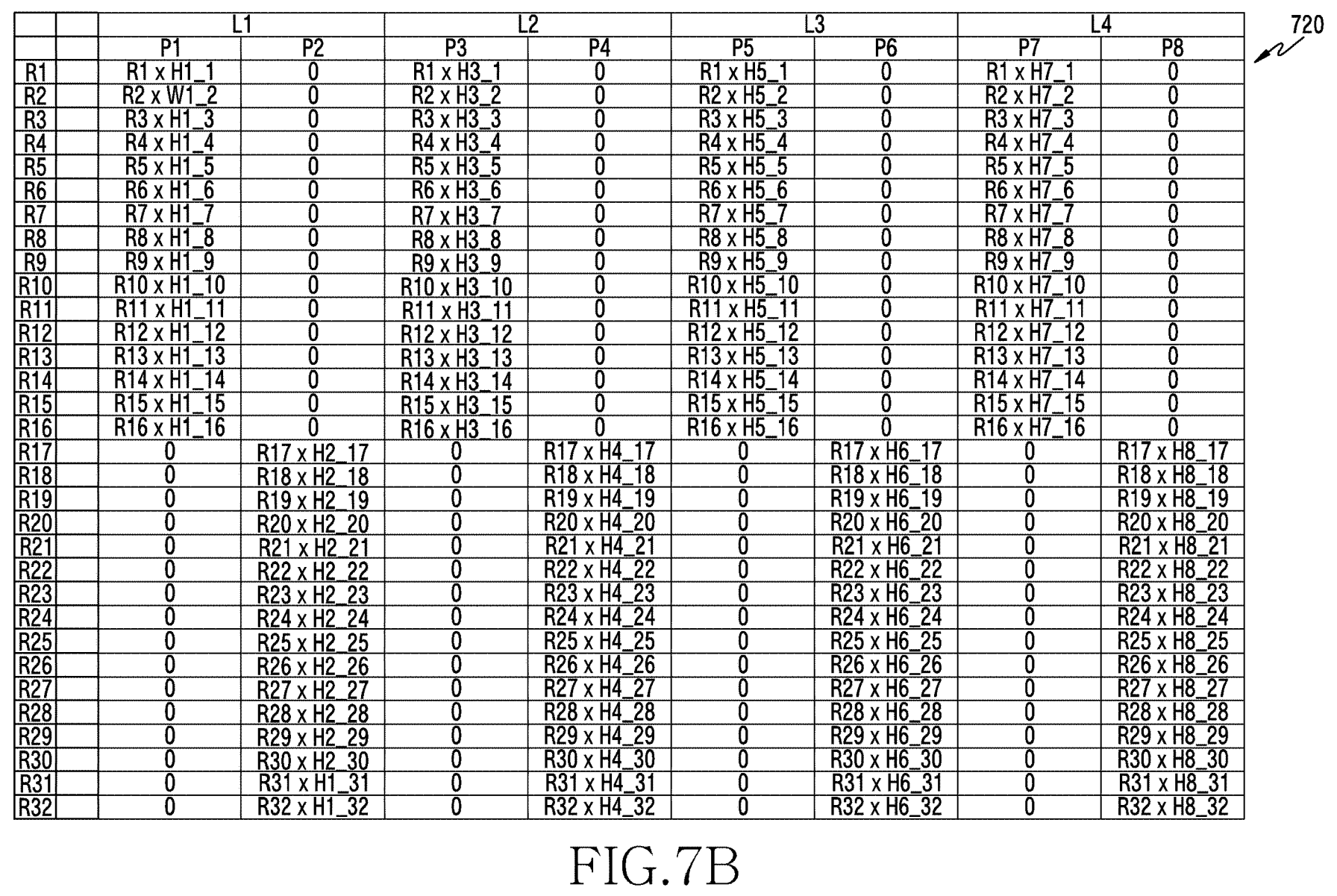

FIG. 7B illustrates an example of a fronthaul path configuration, when K=4 and M=8 in 32T32R. Referring to FIG. 7B, the number of FH ports may be set to be less than the number of UL layers. $R_k$ denotes a signal received at a k-th antenna. $H_{a\_b}$ means a channel for a b-th antenna of an a-th user.

As identified in a fronthaul path configuration 720, UL layer data may be configured for 8 users in total. Each user corresponds to a single layer stream. Referring to the fronthaul path configuration 720, 8 fronthaul paths in total are configured between a DU and an RU. In this case, information transferred through each fronthaul may be configured as information on different antennas for diversity, even in case of a single layer. For example, a $5^{th}$ fronthaul path P5 and $6^{th}$ fronthaul path P6 for a $3^{rd}$ layer L3 may be configured to include channel information related to different Rx antennas. The RU may collect a channel result received through 16 antenna ports for 8 users in total. Each user may perform 16×16 communication with the RU. The RU may divide 32 transmission/reception ports into two groups to perform MU-MIMO communication with 4 users through antennas of a first group and MU-MIMO communication with other 4 users through antennas of a second group. Since the RU needs to deliver 128 pieces of channel data to the DU, the fronthaul path configuration 720 requires relatively low fronthaul transmission capacity compared to the fronthaul path configuration 710 of FIG. 7A.

Figure 7C:
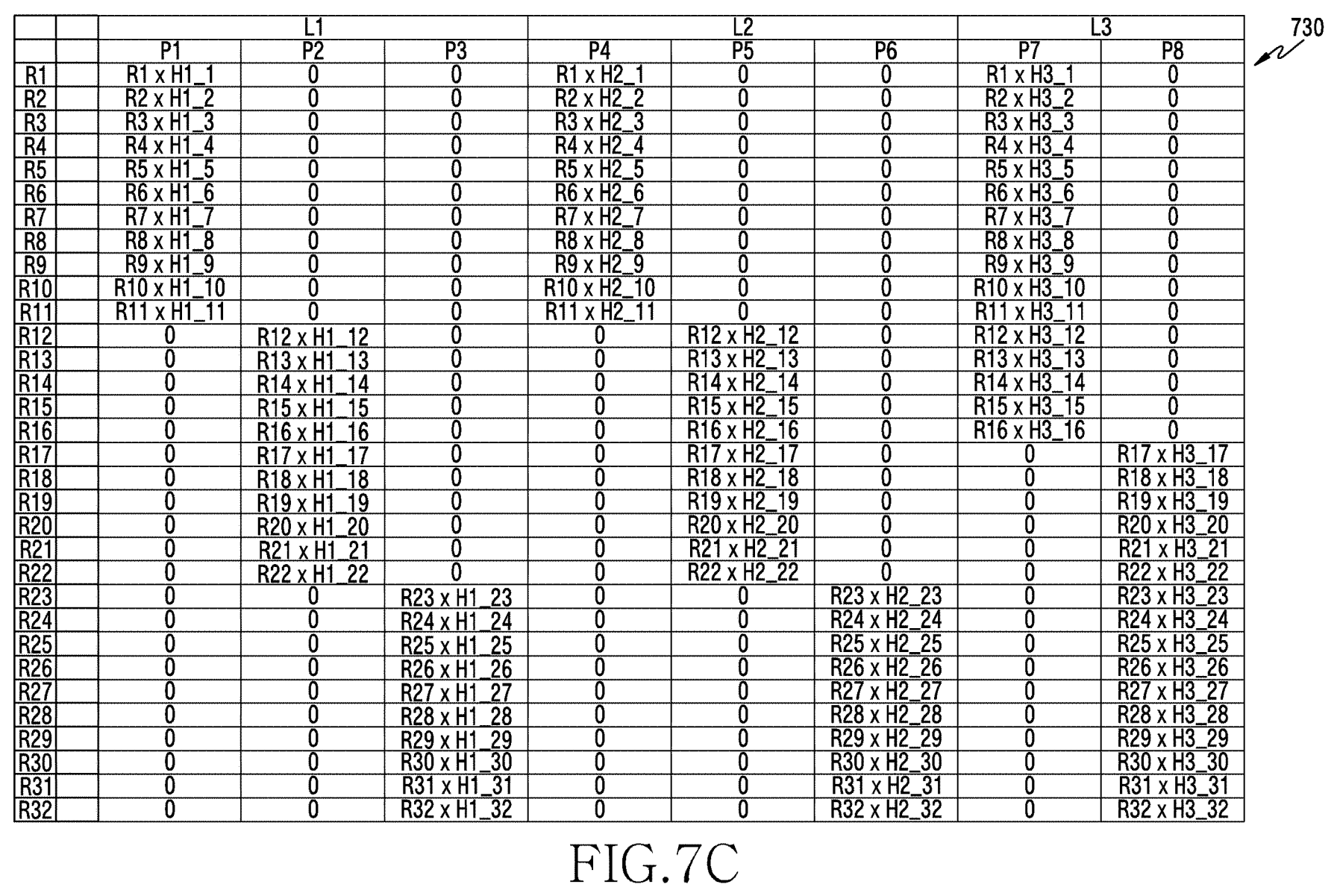

FIG. 7C illustrates an example of a fronthaul path configuration, when K=3, M=8 in 32T32R. The number of FH ports may be set to be less than the number of UL layers. $R_k$ denotes a signal received at a k-th antenna. $H_{a\_b}$ means a channel for a b-th antenna of an a-th user. As identified in a fronthaul path configuration 730, UL layer data may be configured for 3 users in total. Each user corresponds to a single layer stream.

The same number of antennas are assigned to each fronthaul path in FIG. 7A and FIG. 7B. Embodiments of the disclosure are not limited thereto. Distribution between antenna ports and multiple users is not necessarily configured evenly. In this case, in order to maintain diversity between antennas, independence between the antennas needs to be ensured in different fronthaul paths of the same layer.

Referring to FIG. 7C, channel information for a first user and second user may be transferred to a DU through each fronthaul path (three fronthaul paths in total), by using diversity classified into 3 groups. However, channel information for a third user may be transferred to the DU through each fronthaul path (2 fronthaul paths in total), by using diversity classified into 2 groups. In addition, referring to the fronthaul path configuration 730, a total of 8 fronthaul paths are configured on a fronthaul interface between the DU and the RU. Referring to the fronthaul path configuration 730 of FIG. 7C, if the number of fronthaul paths is 3 in one layer, 32 antenna ports may be divided into 3 parts, i.e., {11, 11, 10}. Intermediate channel information for antenna port groups may be transferred through respective fronthaul paths.

FIG. 7D illustrates an example of a fronthaul path configuration, when K=2, M=8 in 32T32R. The number of FH ports may be set to be less than the number of UL layers. $R_k$ denotes a signal received at a k-th antenna. $H_{a\_b}$ means a channel for a b-th antenna of an a-th user.

As identified in a fronthaul path configuration 740, UL layer data may be configured for 2 users in total. Each user corresponds to a single layer stream. Referring to the fronthaul path configuration 740, 8 fronthaul paths in total are configured between a DU and an RU. In this case, information transferred through each fronthaul may use diversity classified into 4 groups. Channel information transmitted through different fronthaul paths in respective layers may be channel information for different antennas. That is, antenna diversity may be used. For example, a $5^{th}$ fronthaul path P5 and 8th fronthaul path P8 for a $2^{nd}$ layer L2 may be configured to include channel information related to different Rx antennas. The RU may collect a channel result received through 32 antenna ports for 2 users in total. Each user may perform 32×32 communication with the RU. However, the fronthaul path configuration 740 may allow each layer to use antenna diversity, thereby transmitting only 64 pieces of channel data to the DU, unlike in FIG. 7A. Therefore, the fronthaul path configuration 740 requires relatively low fronthaul transmission capacity compared to the fronthaul path configuration 710 of FIG. 7A.

A new types of section extension field is defined through FIG. 6A and FIG. 6B. According to an embodiment, information for indicating an Rx port used to configure a fronthaul path, that is, a section extension field related to indication information, may be used together with a different section extension field. For example, the different section extension field may be configured as shown in Table 1 below. Hereinafter, information such as the indication information 610 or the indication information 620 corresponds to a section extension type #12. An embodiment of the disclosure is not limited to a specific number. For example, the section extension type may correspond to #16.

TABLE 1

| Section Extension | Title | Interaction with existing Section Extensions |
|---|---|---|
| 1 | Beamforming Weights | As Section Extension = 12 is only used for UE Channel Information based BF, this section extension cannot be used together with Section Extension = 12. |
| 2 | Beamforming Attributes | As Section Extension = 12 is only used for UE Channel Information based BF, this section extension cannot be used together with Section Extension = 12. |
| 3 | DL Precoding | As Section Extension = 12 is only used for UL beamforming, this section extension cannot be used together with Section Extension = 12. |
| 4 | Modulation Compression | Section Extension = 4 can be used with Section Extension = 12. |
| 5 | Modulation Compression (Additional) | Section Extension = 5 can be used with Section Extension = 12. |
| 6 | Non-contiguous PRB | Section Extension = 6 can be used with Section Extension = 12. |
| 7 | eAxC Mask | Section Extension = 7 can be used with Section Extension = 12. |
| 8 | Regularizatoin Factor | Section Extension = 8 can be used with Section Extension = 12. |
| 9 | DSS Parameters | Section Extension = 9 can be used with Section Extension = 12. |
| 10 | Multiple port grouping | Section Extension = 10 can be used with Section Extension = 12. In this case, the format of section extension should be changed to suit the Rx eAxC grouping configuration. |
| 11 | Flexible Beamforming Weights | As Section Extension = 12 is only used for UE Channel Information based BF, this section extension cannot be used together with Section Extension = 12. |

Figure 8:
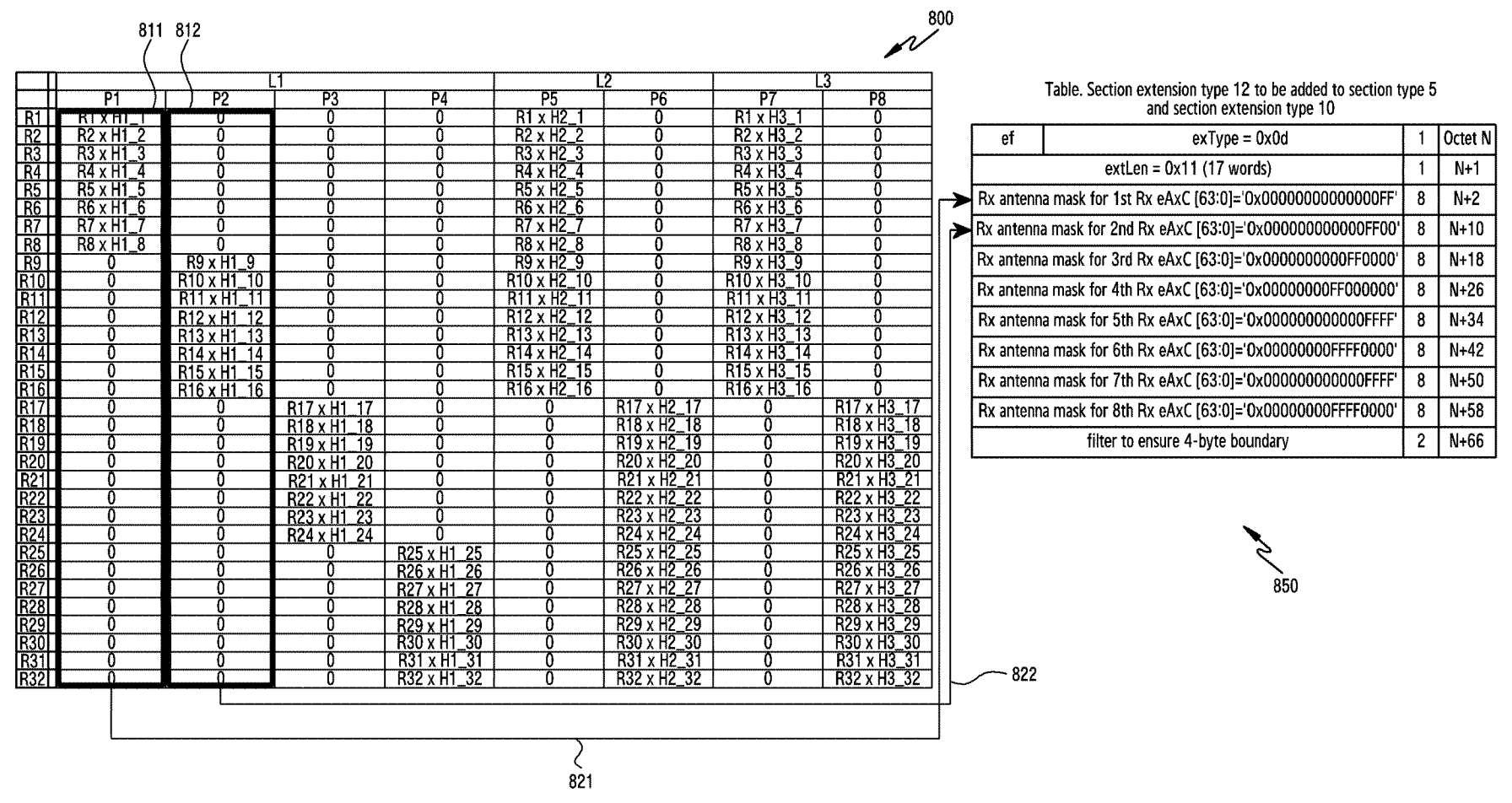

FIG. 8 illustrates an example of a control message based on a fronthaul path configuration according to an embodiment of the disclosure. In an example of a control message illustrated in FIG. 8, the section extension type #10 of Table 1 above is used together with the aforementioned section extension type #12, that is, a section extension type for indicating an Rx port used to configure a fronthaul path.

Referring to FIG. 8, an example of a fronthaul path configuration is illustrated when K=3, M=8 in 32T32R. The number of FH ports may be set to be less than the number of UL layers. $R_k$ denotes a signal received at a k-th antenna. $H_{a\_b}$ means a channel for a b-th antenna of an a-th user.

As identified in a fronthaul path configuration 800, UL layer data may be configured for three (3) users in total. Each user corresponds to a single layer stream. Four (4) fronthaul paths may be assigned to a layer of a first user. Two (2) fronthaul paths may be assigned to a layer of a second user. Two (2) fronthaul paths may be assigned to a layer of a third user. When referring to the fronthaul path configuration 800, a total of eight (8) fronthaul paths are configured between the DU and the RU.

Channel information 811 of a first layer L1 toward a first fronthaul path may include channel information for a total of eight (8) Rx antennas R1 to R8. In the channel information 811, '0' may be applied to a value for other antennas (e.g., R9 to R32). Channel information 812 of the first layer L1 toward a second fronthaul path may include channel information for a total of 8 Rx antennas R9 to R16. In the channel information 812, '0' may be applied to a value for other antennas (e.g., R0 to R8, R17 to R32). For high diversity between fronthaul paths in the same layer, each fronthaul path may be configured such that channel information for the same antenna is not included.

Such a configuration method may be identified through a control message 850. The control message 850 may include indication information used together with the section extension type #10. Herein, the indication information may include a bitmap for each Rx antenna per fronthaul path. The bitmap may be defined in the order of [R32, R31, R30, . . . , R2, R1, R0]. For example, a bitmap 821 for channel information 811 may be expressed as [0000 0000 0000 0000 0000 0000 1111 1111]. When the bitmap for the channel information 811 is simplified in hexadecimal, it may be expressed as [000000FF].

In addition, for example, a bitmap 822 for channel information 812 may be expressed as [0000 0000 0000 0000 1111 1111 0000 0000]. When the bitmap for the channel information 812 is simplified in hexadecimal, it may be expressed as [0000FF00]. The control message 850 may indicate antennas to be used to collect channel information in each fronthaul path in the form of a bitmap in the aforementioned manner. When eight (8) fronthaul paths are configured between the DU and the RU, the control message 850 may include eight (8) bitmaps.

Figure 9:
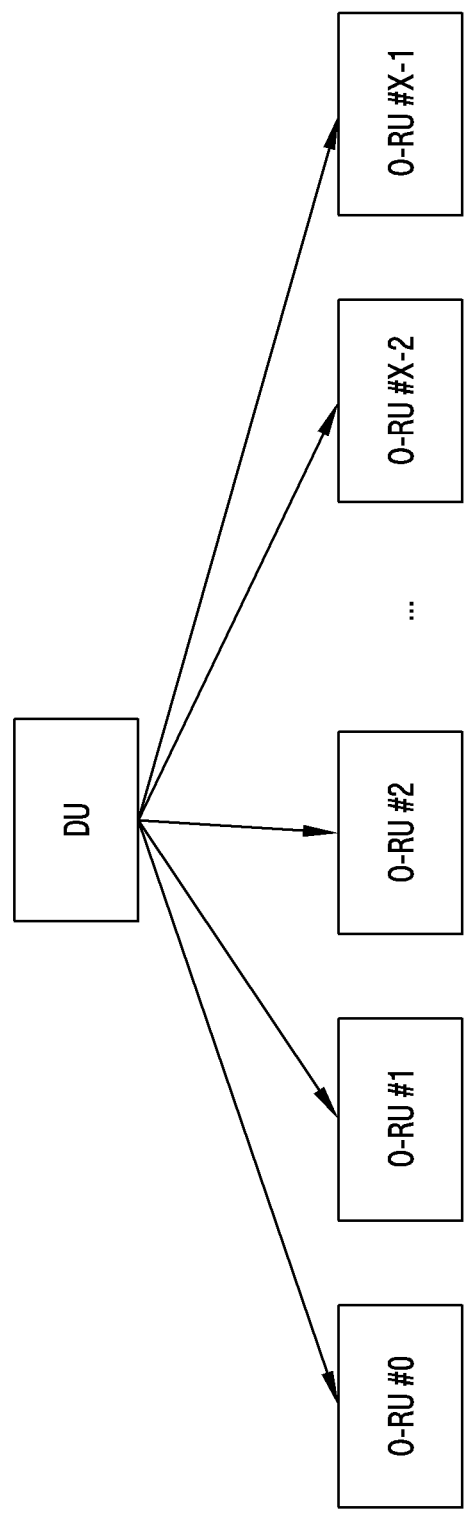
FIG. 9 illustrates an example of a connection between a DU and RUs according to an embodiment of the disclosure.

FIG. 9 illustrates an example of a connection between a DU and RUs (O-RU #0, O-RU #1, . . . , O-RU #X−1) according to an embodiment of the disclosure. A stepwise fronthaul configuration according to embodiments of the disclosure is a UL beamforming scheme for reducing a processing load in the RU and increasing processing efficiency in the DU. Since the stepwise fronthaul configuration defines fronthaul paths (or fronthaul ports) configured between the DU and the RU, the DU may assume that the RU will transfer a specified number of pieces of channel information to the DU through each fronthaul path.

Referring to FIG. 9, the DU may be coupled to one or more RUs. The DU may be coupled to a plurality of RUs. In this case, since the RU conforms to the O-RAN standard, it may be referred to as an 'O-RU.' The DU may be coupled to O-RUs. The DU may be coupled to an O-RU #0, an O-RU #1, an O-RU #2, . . . , to an O-RU #X−1.

According to an embodiment, some of the O-RUs may be configured with a stepwise fronthaul configuration. In addition, according to an embodiment, the remaining some of the O-RUs may not be configured with the stepwise fronthaul configuration. In this case, the DU identifies whether the RU supports the stepwise fronthaul configuration, and thus determines not to transmit a corresponding message to the RU not supporting the function, which may also be understood as an embodiment of the disclosure. In addition, according to an embodiment, the fronthaul path configuration may be performed on some of the O-RUs according to the control message 600, whereas the fronthaul path configuration may be performed on the remaining some of the O-RUs according to the control message 650. When antenna distribution is performed identically for each layer, the DU may configure RUs through little overhead by using the control message 600. On the other hand, when the antenna distribution is not identical for each layer, the DU may configure the RU by using the control message 650 to adaptively perform scheduling for each user.

According to one or more embodiments of the disclosure, a method of operating a Digital Unit (DU) of a base station in a wireless communication system may include transmitting a control message for configuring a plurality of fronthaul paths to a Radio Unit (RU), receiving channel information configured for each of the plurality of fronthaul paths from the RU through a corresponding fronthaul path, and obtaining Uplink (UL) layer data, based on the channel information. The channel information may include information on a channel related to a subset of a plurality of receive (Rx) antennas of the RU.

According to an embodiment, the control message may include a bitmap. The bitmap may be configured to indicate whether each of the plurality of Rx antennas of the RU is available for the channel estimation information in units of 1 bit.

According to an embodiment, the control message may include a bitmap for each of the plurality of fronthaul paths. The bitmap may be configured to indicate whether each of the plurality of Rx antennas of the RU is available for channel estimation information of a corresponding fronthaul path in units of 1 bit.

According to an embodiment, the number of the plurality of fronthaul paths may be set to be less than the number of the plurality of Rx antennas of the RU and greater than the number of pieces of the UL layer data.

According to an embodiment, among the UL layers, one UL layer may correspond to a first fronthaul path and a second fronthaul path. Channel estimation information of the first fronthaul path may relate to a first subset of the plurality of Rx antennas of the RU. Channel estimation information of the second fronthaul path may relate to a second subset of the plurality of Rx antennas of the RU. An antenna of the second subset may be configured not to include an antenna of the first subset.

According to one or more embodiments of the disclosure, a method of operating an RU of a base station in a wireless communication system may include receiving a control message for configuring a plurality of fronthaul paths from a DU, generating channel estimation information configured for each of the plurality of fronthaul paths, based on signals received through a plurality of Rx antennas of the RU, and transmitting channel information configured for each of the plurality of fronthaul paths to the DU through a corresponding fronthaul path. The channel information may include information on a channel related to a subset of a plurality of Rx antennas of the RU.

According to an embodiment, the control message may include a bitmap. The bitmap may be configured to indicate whether each of the plurality of Rx antennas of the RU is available for the channel estimation information in units of 1-bit.

According to an embodiment, the control message may include a bitmap for each of the plurality of fronthaul paths. The bitmap may be configured to indicate whether each of the plurality of Rx antennas of the RU is available for channel estimation information of a corresponding fronthaul path in units of 1 bit.

According to an embodiment, the number of the plurality of fronthaul paths may be set to be less than the number of the plurality of Rx antennas of the RU and greater than the number of pieces of the UL layer data.

According to an embodiment, among the UL layers, one UL layer may correspond to a first fronthaul path and a second fronthaul path. Channel estimation information of the first fronthaul path may relate to a first subset of the plurality of Rx antennas of the RU. Channel estimation information of the second fronthaul path may relate to a second subset of the plurality of Rx antennas of the RU. An antenna of the second subset may be configured not to include an antenna of the first subset.

According to one or more embodiments of the disclosure, an apparatus of a DU of a base station in a wireless communication system may include at least one transceiver and at least one processor. The at least one processor may be configured to transmit a control message for configuring a plurality of fronthaul paths to an RU, receiving channel information configured for each of the plurality of fronthaul paths from the RU through a corresponding fronthaul path, and obtaining UL layer data, based on the channel information. The channel information may include information on a channel related to a subset of a plurality of Rx antennas of the RU.

According to an embodiment, the control message may include a bitmap. The bitmap may be configured to indicate whether each of the plurality of Rx antennas of the RU is available for the channel estimation information in units of 1-bit.

According to an embodiment, the control message may include a bitmap for each of the plurality of fronthaul paths. The bitmap may be configured to indicate whether each of the plurality of Rx antennas of the RU is available for channel estimation information of a corresponding fronthaul path in units of 1 bit.

According to an embodiment, the number of the plurality of fronthaul paths may be set to be less than the number of the plurality of Rx antennas of the RU and greater than the number of pieces of the UL layer data.

According to an embodiment, among the UL layers, one UL layer may correspond to a first fronthaul path and a second fronthaul path. Channel estimation information of the first fronthaul path may relate to a first subset of the plurality of Rx antennas of the RU. Channel estimation information of the second fronthaul path may relate to a second subset of the plurality of Rx antennas of the RU. An antenna of the second subset may be configured not to include an antenna of the first subset.

According to one or more embodiments of the disclosure, an apparatus of an RU of a base station in a wireless communication system may include at least one transceiver and at least one processor. The at least one processor may be configured to receiving a control message for configuring a plurality of fronthaul paths from a DU, generating channel estimation information configured for each of the plurality of fronthaul paths, based on signals received through a plurality of Rx antennas of the RU, and transmitting channel information configured for each of the plurality of fronthaul paths to the DU through a corresponding fronthaul path. The channel information may include information on a channel related to a subset of a plurality of Rx antennas of the RU.

According to an embodiment, the control message may include a bitmap. The bitmap may be configured to indicate whether each of the plurality of Rx antennas of the RU is available for the channel estimation information in units of 1-bit.

According to an embodiment, the control message may include a bitmap for each of the plurality of fronthaul paths. The bitmap may be configured to indicate whether each of the plurality of Rx antennas of the RU is available for channel estimation information of a corresponding fronthaul path in units of 1 bit.

According to an embodiment, the number of the plurality of fronthaul paths may be set to be less than the number of the plurality of Rx antennas of the RU and greater than the number of pieces of the UL layer data.

According to an embodiment, among the UL layers, one UL layer may correspond to a first fronthaul path and a second fronthaul path. Channel estimation information of the first fronthaul path may relate to a first subset of the plurality of Rx antennas of the RU. Channel estimation information of the second fronthaul path may relate to a second subset of the plurality of Rx antennas of the RU. An antenna of the second subset may be configured not to include an antenna of the first subset.

As described with reference to FIG. 5 to FIG. 8, embodiments of the disclosure propose a method of configuring fronthaul paths between a DU and an RU in a stepwise manner in the middle between the number of Rx antennas and the number of layers to increase performance of channel estimation while reducing a performance load of the RU. Unlike in the conventional standard, ORAN C-plane information according to embodiments of the disclosure may include bit masking information used when the DU specifies to the RU a UL data stream which is a candidate group of combining or selecting M respective fronthaul paths (or FH ports), among N UL data streams received at N Rx antennas. Through this algorithm, an ORAN non-compliant product may also be reused by changing an O-RAN specification as suggested without a HW change.

According to embodiments of the disclosure, a method performed by a Digital Unit (DU) in a wireless communication system may include generating a control plane message including User Equipment (UE) scheduling information, and transmitting the control plane message to a Radio Unit (RU). The control plane message may include section extension information for antenna mapping in Uplink (UL) beamforming-based UE channel information. The section extension information may include bit masking information for indicating whether antennas are to be combined.

According to an embodiment of the disclosure, the bit masking information may include a bitmap indicating whether antennas corresponding to respective bits are to be combined. The maximum number of antennas corresponding to the bitmap may be 64.

According to an embodiment of the disclosure, the control plane message may further include different section extension information for multi-port grouping. The bit masking information may include bitmaps for a plurality of reception eAxCs related to the different section extension information.

According to an embodiment of the disclosure, the plurality of reception eAxCs may include a first reception eAxC and a second reception eAxC. Each bit of a bitmap corresponding to the first reception eAxC out of the bitmaps may indicate whether a corresponding antenna is to be combined in the first reception eAxC. Each bit of a bitmap corresponding to the second reception eAxC out of the bitmaps may indicate whether a corresponding antenna is to be combined in the second reception eAxC.

According to an embodiment of the disclosure, the method may further include receiving the UE channel information from the RU, through a fronthaul path between the DU and the RU. The UE channel information may include information in which channel information for at least two antennas is combined out of the antennas, according to the control plane message.

According to embodiments of the disclosure, a method performed by an RU of a base station in a wireless communication system may include receiving a control plane message including UE scheduling information from a DU. The control plane message may include section extension information for antenna mapping in UL beamforming-based UE channel information. The section extension information may include bit masking information for indicating whether antennas are to be combined.

According to an embodiment of the disclosure, the bit masking information may include a bitmap indicating whether antennas corresponding to respective bits are to be combined. The maximum number of antennas corresponding to the bitmap may be 64.

According to an embodiment of the disclosure the control plane message may further include different section extension information for multi-port grouping. The bit masking information may include bitmaps for a plurality of reception eAxCs related to the different section extension information.

According to an embodiment of the disclosure, the plurality of reception eAxCs may include a first reception eAxC and a second reception eAxC. Each bit of a bitmap corresponding to the first reception eAxC out of the bitmaps may indicate whether a corresponding antenna is to be combined in the first reception eAxC. Each bit of a bitmap corresponding to the second reception eAxC out of the bitmaps may indicate whether a corresponding antenna is to be combined in the second reception eAxC.

According to an embodiment of the disclosure, the method may further include transmitting the UE channel information to the DU, through a fronthaul path between the DU and the RU. The UE channel information may include information in which channel information for at least two antennas is combined out of the antennas, according to the control plane message.

According to embodiments of the disclosure, an apparatus of a DU of a base station in a wireless communication system may include at least one transceiver, and at least one processor. The at least one processor may be configured to generate a control plane message including UE scheduling information, and transmit the control plane message to an RU. The control plane message may include section extension information for antenna mapping in UL beamforming-based UE channel information. The section extension information may include bit masking information for indicating whether antennas are to be combined.

According to an embodiment of the disclosure, the bit masking information may include a bitmap indicating whether antennas corresponding to respective bits are to be combined. The maximum number of antennas corresponding to the bitmap may be 64.

According to an embodiment of the disclosure, the control plane message may further include different section extension information for multi-port grouping. The bit masking information may include bitmaps for a plurality of reception eAxCs related to the different section extension information.

According to an embodiment of the disclosure, the plurality of reception eAxCs may include a first reception eAxC and a second reception eAxC. Each bit of a bitmap corresponding to the first reception eAxC out of the bitmaps may indicate whether a corresponding antenna is to be combined in the first reception eAxC. Each bit of a bitmap corresponding to the second reception eAxC out of the bitmaps may indicate whether a corresponding antenna is to be combined in the second reception eAxC.

According to an embodiment of the disclosure, the at least one processor may be further configured to receive the UE channel information from the RU, through a fronthaul path between the DU and the RU. The UE channel information may include information in which channel information for at least two antennas is combined out of the antennas, according to the control plane message.

According to embodiments of the disclosure, an apparatus of an RU of a base station in a wireless communication system may include at least one transceiver, and at least one processor. The at least one processor may be configured to receive a control plane message including UE scheduling information from a DU. The control plane message may include section extension information for antenna mapping in UL beamforming-based UE channel information. The section extension information may include bit masking information for indicating whether antennas are to be combined.

According to an embodiment of the disclosure, the bit masking information may include a bitmap indicating whether antennas corresponding to respective bits are to be combined. The maximum number of antennas corresponding to the bitmap may be 64.

According to an embodiment of the disclosure, the control plane message may further include different section extension information for multi-port grouping. The bit masking information may include bitmaps for a plurality of reception eAxCs related to the different section extension information.

According to an embodiment of the disclosure, the plurality of reception eAxCs may include a first reception eAxC and a second reception eAxC. Each bit of a bitmap corresponding to the first reception eAxC out of the bitmaps may indicate whether a corresponding antenna is to be combined in the first reception eAxC. Each bit of a bitmap corresponding to the second reception eAxC out of the bitmaps may indicate whether a corresponding antenna is to be combined in the second reception eAxC.

According to an embodiment of the disclosure, the at least one processor may be further configured to transmit the UE channel information to the DU, through a fronthaul path between the DU and the RU. The UE channel information may include information in which channel information for at least two antennas is combined out of the antennas, according to the control plane message.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the one or more embodiments of the disclosure are not limited to a single or a plurality of components. Therefore, a component expressed in a plural form may also be expressed in a singular form, or vice versa.

While embodiments of the disclosure has been shown and described, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. A method performed by an open radio access network (O-RAN) distributed unit (O-DU) in a wireless communication system, the method comprising:
generating a control plane message comprising User Equipment (UE) scheduling information; and
transmitting the control plane message to an O-RAN radio unit (O-RU),
wherein the control plane message further comprises section extension information, and
wherein the section extension information comprises bit masking information indicating antennas to be combined.

2. The method of claim 1, wherein the section extension information is for antenna mapping in Uplink (UL) beamforming-based UE channel information.

3. The method of claim 1, wherein the bit masking information comprises a bitmap indicating whether antennas corresponding to respective bits are to be combined, and wherein a maximum number of antennas corresponding to the bitmap is 64.

4. The method of claim 1, wherein the control plane message further comprises different section extension information for multi-port grouping, and
wherein the bit masking information comprises bitmaps for a plurality of reception extended antenna carriers (eAxCs) related to the different section extension information.

5. The method of claim 4, wherein the plurality of reception eAxCs comprise a first reception eAxC and a second reception eAxC,
wherein each bit of a bitmap corresponding to the first reception eAxC out of the bitmaps indicates whether a corresponding antenna is to be combined in the first reception eAxC, and
wherein each bit of a bitmap corresponding to the second reception eAxC out of the bitmaps indicates whether a corresponding antenna is to be combined in the second reception eAxC.

6. The method of claim 2, further comprising receiving the UE channel information from the O-RU, through a fronthaul path between the O-DU and the O-RU,
wherein the UE channel information comprises information in which channel information for at least two antennas is combined out of the antennas, according to the control plane message.

7. A method performed by an open radio access network (O-RAN) radio unit (O-RU) of a base station in a wireless communication system, the method comprising:
receiving a control plane message comprising User Equipment (UE) scheduling information from an O-RAN distributed unit (O-DU),
wherein the control plane message further comprises section extension information for antenna mapping, and
wherein the section extension information comprises bit masking information indicating antennas to be combined.

8. The method of claim 7, wherein the section extension information is used by the O-RU for antenna mapping in Uplink (UL) beamforming-based UE channel information.

9. The method of claim 7, wherein the bit masking information comprises a bitmap indicating whether antennas corresponding to respective bits are to be combined, and
wherein a maximum number of antennas corresponding to the bitmap is 64.

10. The method of claim 7, wherein the control plane message further comprises different section extension information for multi-port grouping, and
wherein the bit masking information comprises bitmaps for a plurality of reception eAxCs related to the different section extension information.

11. The method of claim 10, wherein the plurality of reception eAxCs comprise a first reception eAxC and a second reception eAxC,
wherein each bit of a bitmap corresponding to the first reception eAxC out of the bitmaps indicates whether a corresponding antenna is to be combined in the first reception eAxC, and
wherein each bit of a bitmap corresponding to the second reception eAxC out of the bitmaps indicates whether a corresponding antenna is to be combined in the second reception eAxC.

12. The method of claim 8, further comprising transmitting the UE channel information to the O-DU, through a fronthaul path between the O-DU and the O-RU,
wherein the UE channel information comprises information in which channel information for at least two antennas is combined out of the antennas, according to the control plane message.

13. An open radio access network (O-RAN) distributed unit (O-DU) of a base station in a wireless communication system, the DU comprising:
at least one transceiver; and
at least one processor operatively connected to the at least one transceiver, the at least one processor being configured to:
generate a control plane message comprising User Equipment (UE) scheduling information; and
transmit, through the at least one transceiver, the control plane message to an open radio access network (O-RAN) radio unit (O-RU),
wherein the control plane message further comprises section extension information for antenna mapping, and
wherein the section extension information comprises bit masking information indicating antennas to be combined.

14. The O-DU of claim 13, wherein the section extension information is for antenna mapping in Uplink (UL) beamforming-based UE channel information.

15. The O-DU of claim 13, wherein the bit masking information comprises a bitmap indicating whether antennas corresponding to respective bits are to be combined, and
wherein a maximum number of antennas corresponding to the bitmap is 64.

16. The O-DU of claim 13, the control plane message further comprises different section extension information for multi-port grouping, and
wherein the bit masking information comprises bitmaps for a plurality of reception extended antenna carriers (eAxCs) related to the different section extension information.

17. The O-DU of claim 16, wherein the plurality of reception eAxCs comprise a first reception eAxC and a second reception eAxC,
wherein each bit of a bitmap corresponding to the first reception eAxC out of the bitmaps indicates whether a corresponding antenna is to be combined in the first reception eAxC, and
wherein each bit of a bitmap corresponding to the second reception eAxC out of the bitmaps indicates whether a corresponding antenna is to be combined in the second reception eAxC.

18. An open radio access network (O-RAN) radio unit (O-RU) of a base station in a wireless communication system, the O-RU comprising:
at least one transceiver; and
at least one processor operatively connected to the at least one transceiver, the at least one processor being configured to receive, through the at least one transceiver, a control plane message comprising User Equipment (UE) scheduling information from an open radio access network (O-RAN) distributed unit (O-DU),
wherein the control plane message further comprises section extension information for antenna mapping, and
wherein the section extension information comprises bit masking information indicating antennas to be combined.

19. The O-RU of claim 18, wherein the section extension information is used by the O-RU for antenna mapping in Uplink (UL) beamforming-based UE channel information.

20. The O-RU of claim 19, wherein the bit masking information comprises a bitmap indicating whether antennas corresponding to respective bits are to be combined, and wherein a maximum number of antennas corresponding to the bitmap is 64.

* * * * *